United States Patent
Van Os et al.

(10) Patent No.: US 10,841,739 B2
(45) Date of Patent: *Nov. 17, 2020

(54) LOCATION SHARING

(71) Applicant: Apple Inc., Cupertino, CA (US)

(72) Inventors: Marcel M W A Van Os, San Francisco, CA (US); Scott Herz, Santa Clara, CA (US); Mike Matas, San Francisco, CA (US)

(73) Assignee: Apple Inc., Cupertino, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/451,572

(22) Filed: Jun. 25, 2019

(65) Prior Publication Data

US 2019/0313208 A1    Oct. 10, 2019

Related U.S. Application Data

(60) Continuation of application No. 13/745,023, filed on Jan. 18, 2013, now Pat. No. 10,368,199, which is a
(Continued)

(51) Int. Cl.
*H04W 24/00* (2009.01)
*H04W 4/02* (2018.01)
(Continued)

(52) U.S. Cl.
CPC ............. *H04W 4/025* (2013.01); *H04L 67/18* (2013.01); *H04W 4/02* (2013.01); *H04W 4/029* (2018.02)

(58) Field of Classification Search
CPC ..... H04W 4/025; H04W 4/029; H04W 67/18; H04W 4/02; H04W 4/021; H04W 4/12;
(Continued)

(56) References Cited

U.S. PATENT DOCUMENTS

| 4,644,351 A | 2/1987 | Zabarsky |
| 4,903,212 A | 2/1990 | Yokouchi |
| (Continued) | | |

FOREIGN PATENT DOCUMENTS

| BR | 9904979 A | 12/2000 |
| CA | 2287596 A1 | 4/2000 |
| (Continued) | | |

OTHER PUBLICATIONS

US 6,731,928 B1, 05/2004, Tanaka (withdrawn)
(Continued)

*Primary Examiner* — Stephen M D'Agosta
(74) *Attorney, Agent, or Firm* — Blank Rome LLP

(57) ABSTRACT

Geographic location data is sent from a first device to a second device with a modified message to signal the presence of geographic location data associated with the message. The message can include (or attach) the geographic location data or file, or the message can include a link to a network-based resource which the second device can use to obtain the geographic location data. In some implementations, when a user of the first device views a location on a map display of the first device, a graphical user interface is presented to allow the user to select an option to share the geographic location with the second device. The second device receives geographic location data or a link from the first device which can trigger a map display on the second device showing the location of the first device and, optionally, the location of the second device.

10 Claims, 11 Drawing Sheets

Related U.S. Application Data division of application No. 12/165,413, filed on Jun. 30, 2008, now Pat. No. 8,369,867.

(51) Int. Cl.
*H04W 4/029* (2018.01)
*H04L 29/08* (2006.01)

(58) Field of Classification Search
CPC .............. G06F 3/04883; G06F 3/1454; G06F 3/04842; G06F 17/24; G06F 3/0481; H04L 51/32; H04L 67/18; H04L 65/403; H04L 67/04; H04M 3/493; H04M 3/53366
See application file for complete search history.

(56) References Cited

U.S. PATENT DOCUMENTS

| | | |
|---|---|---|
| 4,907,159 A | 3/1990 | Mauge |
| 4,999,783 A | 3/1991 | Tenmoku |
| 5,031,104 A | 7/1991 | Ikeda |
| 5,046,011 A | 9/1991 | Kakihara |
| 5,067,081 A | 11/1991 | Person |
| 5,126,941 A | 6/1992 | Gurmu |
| 5,164,904 A | 11/1992 | Sumner |
| 5,170,165 A | 12/1992 | Iihoshi |
| 5,173,691 A | 12/1992 | Sumner |
| 5,182,555 A | 1/1993 | Sumner |
| 5,187,810 A | 2/1993 | Yoneyama |
| 5,195,031 A | 3/1993 | Ordish |
| 5,208,763 A | 5/1993 | Hong |
| 5,218,629 A | 6/1993 | Dumond, Jr. |
| 5,243,652 A | 9/1993 | Teare |
| 5,274,560 A | 12/1993 | LaRue |
| 5,289,572 A | 2/1994 | Yano |
| 5,295,064 A | 3/1994 | Malec |
| 5,307,278 A | 4/1994 | Hermans |
| 5,317,311 A | 5/1994 | Martell |
| 5,337,044 A | 8/1994 | Folger |
| 5,339,391 A | 8/1994 | Wroblewski |
| 5,371,678 A | 12/1994 | Nomura |
| 5,374,933 A | 12/1994 | Kao |
| 5,379,057 A | 1/1995 | Clough |
| 5,390,125 A | 2/1995 | Sennott |
| 5,406,490 A | 4/1995 | Braegas |
| 5,416,712 A | 5/1995 | Geier |
| 5,416,890 A | 5/1995 | Beretta |
| 5,469,362 A | 11/1995 | Hunt |
| 5,479,600 A | 12/1995 | Wroblewski |
| 5,504,482 A | 4/1996 | Schreder |
| 5,508,707 A | 4/1996 | LeBlanc |
| 5,510,801 A | 4/1996 | Engelbrecht |
| 5,519,760 A | 5/1996 | Borkowski |
| 5,523,950 A | 6/1996 | Peterson |
| 5,537,460 A | 7/1996 | Holliday, Jr. |
| 5,539,395 A | 7/1996 | Buss |
| 5,539,647 A | 7/1996 | Shibata |
| 5,552,989 A | 9/1996 | Bertrand |
| 5,559,520 A | 9/1996 | Barzegar |
| 5,570,412 A | 10/1996 | LeBlanc |
| 5,598,572 A | 1/1997 | Tanikoshi |
| 5,627,547 A | 5/1997 | Ramaswamy |
| 5,627,549 A | 5/1997 | Park |
| 5,628,050 A | 5/1997 | McGraw |
| 5,630,206 A | 5/1997 | Urban |
| 5,636,245 A | 6/1997 | Ernst |
| 5,642,303 A | 6/1997 | Small |
| 5,646,853 A | 7/1997 | Takahashi |
| 5,654,908 A | 8/1997 | Yokoyama |
| 5,663,732 A | 9/1997 | Stangeland |
| 5,675,362 A | 10/1997 | Clough |
| 5,675,573 A | 10/1997 | Karol |
| 5,677,837 A | 10/1997 | Reynolds |
| 5,684,859 A | 11/1997 | Chanroo |
| 5,689,252 A | 11/1997 | Ayanoglu |
| 5,689,270 A | 11/1997 | Kelley |
| 5,689,431 A | 11/1997 | Rudow |
| 5,708,478 A | 1/1998 | Tognazzini |
| 5,717,392 A | 2/1998 | Eldridge |
| 5,732,074 A | 3/1998 | Spaur |
| 5,742,666 A | 4/1998 | Alpert |
| 5,745,865 A | 4/1998 | Rostoker |
| 5,748,109 A | 5/1998 | Kosaka |
| 5,752,186 A | 5/1998 | Malackowski |
| 5,754,430 A | 5/1998 | Sawada |
| 5,758,049 A | 5/1998 | Johnson |
| 5,760,773 A | 6/1998 | Berman |
| 5,767,795 A | 6/1998 | Schaphorst |
| 5,774,824 A | 6/1998 | Streit |
| 5,774,829 A | 6/1998 | Cisneros |
| 5,793,630 A | 8/1998 | Theimer |
| 5,796,365 A | 8/1998 | Lewis |
| 5,796,613 A | 8/1998 | Kato |
| 5,806,018 A | 9/1998 | Smith |
| 5,825,306 A | 10/1998 | Hiyokawa |
| 5,825,884 A | 10/1998 | Zdepski |
| 5,831,552 A | 11/1998 | Sogawa |
| 5,835,061 A | 11/1998 | Stewart |
| 5,839,086 A | 11/1998 | Hirano |
| 5,845,227 A | 12/1998 | Peterson |
| 5,848,373 A | 12/1998 | DeLorme |
| 5,862,244 A | 1/1999 | Kleiner |
| 5,867,110 A | 2/1999 | Naito |
| 5,870,686 A | 2/1999 | Monson |
| 5,872,526 A | 2/1999 | Tognazzini |
| 5,873,068 A | 2/1999 | Beaumont |
| 5,883,580 A | 3/1999 | Briancon |
| 5,887,269 A | 3/1999 | Brunts |
| 5,892,454 A | 4/1999 | Schipper |
| 5,893,898 A | 4/1999 | Tanimoto |
| 5,898,680 A | 4/1999 | Johnstone |
| 5,899,954 A | 5/1999 | Sato |
| 5,905,451 A | 5/1999 | Sakashita |
| 5,908,465 A | 6/1999 | Ito |
| 5,910,799 A | 6/1999 | Carpenter |
| 5,923,861 A | 7/1999 | Bertram |
| 5,933,094 A | 8/1999 | Goss |
| 5,933,100 A | 8/1999 | Golding |
| 5,936,572 A | 8/1999 | Loomis |
| 5,938,721 A | 8/1999 | Dussell |
| 5,941,930 A | 8/1999 | Morimoto |
| 5,941,934 A | 8/1999 | Sato |
| 5,946,618 A | 8/1999 | Agre |
| 5,948,040 A | 9/1999 | DeLorme |
| 5,948,041 A | 9/1999 | Abo |
| 5,948,061 A | 9/1999 | Merriman |
| 5,955,973 A | 9/1999 | Anderson |
| 5,959,577 A | 9/1999 | Fan |
| 5,959,580 A | 9/1999 | Maloney |
| 5,968,109 A | 10/1999 | Israni |
| 5,969,678 A | 10/1999 | Stewart |
| 5,982,298 A | 11/1999 | Lappenbusch |
| 5,982,324 A | 11/1999 | Watters |
| 5,987,381 A | 11/1999 | Oshizawa |
| 5,991,692 A | 11/1999 | Spencer |
| 5,999,126 A | 12/1999 | Ito |
| 6,002,932 A | 12/1999 | Kingdon |
| 6,002,936 A | 12/1999 | Roel-Ng |
| 6,005,928 A | 12/1999 | Johnson |
| 6,014,090 A | 1/2000 | Rosen |
| 6,014,607 A | 1/2000 | Yagyu |
| 6,023,653 A | 2/2000 | Ichimura |
| 6,026,375 A | 2/2000 | Hall |
| 6,028,550 A | 2/2000 | Froeberg |
| 6,029,069 A | 2/2000 | Takaki |
| 6,031,490 A | 2/2000 | Forssen |
| 6,041,280 A | 3/2000 | Kohli |
| 6,052,645 A | 4/2000 | Harada |
| 6,058,350 A | 5/2000 | Ihara |
| 6,064,335 A | 5/2000 | Eschenbach |
| 6,067,502 A | 5/2000 | Hayashida |
| 6,069,570 A | 5/2000 | Herring |
| 6,073,013 A | 6/2000 | Agre |

(56) References Cited

U.S. PATENT DOCUMENTS

| | | |
|---|---|---|
| 6,073,062 A | 6/2000 | Hoshino |
| 6,076,041 A | 6/2000 | Watanabe |
| 6,078,818 A | 6/2000 | Kingdon |
| 6,081,206 A | 6/2000 | Kielland |
| 6,085,090 A | 7/2000 | Yee |
| 6,085,148 A | 7/2000 | Jamison |
| 6,087,965 A | 7/2000 | Murphy |
| 6,088,594 A | 7/2000 | Kingdon |
| 6,091,956 A | 7/2000 | Hollenberg |
| 6,091,957 A | 7/2000 | Larkins |
| 6,092,076 A | 7/2000 | McDonough |
| 6,094,607 A | 7/2000 | Diesel |
| 6,101,443 A | 8/2000 | Kato |
| 6,104,090 A | 8/2000 | Unger |
| 6,104,931 A | 8/2000 | Havinis |
| 6,108,555 A | 8/2000 | Maloney |
| 6,111,541 A | 8/2000 | Karmel |
| 6,115,754 A | 9/2000 | Landgren |
| 6,119,014 A | 9/2000 | Alperovich |
| 6,122,520 A | 9/2000 | Want |
| 6,127,945 A | 10/2000 | Mura-Smith |
| 6,128,482 A | 10/2000 | Nixon |
| 6,128,571 A | 10/2000 | Ito |
| 6,134,548 A | 10/2000 | Gottsman |
| 6,138,003 A | 10/2000 | Kingdon |
| 6,138,142 A | 10/2000 | Linsk |
| 6,140,957 A | 10/2000 | Wilson |
| 6,151,309 A | 11/2000 | Busuioc |
| 6,151,498 A | 11/2000 | Roel-Ng |
| 6,154,152 A | 11/2000 | Ito |
| 6,157,381 A | 12/2000 | Bates |
| 6,157,841 A | 12/2000 | Bolduc |
| 6,163,749 A | 12/2000 | McDonough |
| 6,166,627 A | 12/2000 | Reeley |
| 6,167,266 A | 12/2000 | Havinis |
| 6,169,552 B1 | 1/2001 | Endo |
| 6,175,740 B1 | 1/2001 | Souissi |
| 6,177,905 B1 | 1/2001 | Welch |
| 6,177,938 B1 | 1/2001 | Gould |
| 6,181,934 B1 | 1/2001 | Havinis |
| 6,185,427 B1 | 2/2001 | Krasner |
| 6,188,959 B1 | 2/2001 | Schupfner |
| 6,195,557 B1 | 2/2001 | Havinis |
| 6,195,609 B1 | 2/2001 | Pilley |
| 6,199,014 B1 | 3/2001 | Walker |
| 6,199,045 B1 | 3/2001 | Giniger |
| 6,199,099 B1 | 3/2001 | Gershman |
| 6,202,008 B1 | 3/2001 | Beckert |
| 6,202,023 B1 | 3/2001 | Hancock |
| 6,208,866 B1 | 3/2001 | Rouhollahzadeh |
| 6,212,473 B1 | 4/2001 | Stefan |
| 6,216,086 B1 | 4/2001 | Seymour |
| 6,222,483 B1 | 4/2001 | Twitchell |
| 6,233,518 B1 | 5/2001 | Lee |
| 6,236,365 B1 | 5/2001 | LeBlanc |
| 6,236,933 B1 | 5/2001 | Lang |
| 6,246,948 B1 | 6/2001 | Thakker |
| 6,249,252 B1 | 6/2001 | Dupray |
| 6,252,543 B1 | 6/2001 | Camp |
| 6,252,544 B1 | 6/2001 | Hoffberg |
| 6,256,498 B1 | 7/2001 | Ludwig |
| 6,259,405 B1 | 7/2001 | Stewart |
| 6,261,086 B1 | 7/2001 | Fu |
| 6,266,612 B1 | 7/2001 | Dussell |
| 6,266,614 B1 | 7/2001 | Alumbaugh |
| 6,266,615 B1 | 7/2001 | Jin |
| 6,272,342 B1 | 8/2001 | Havinis |
| 6,278,884 B1 | 8/2001 | Kim |
| 6,281,807 B1 | 8/2001 | Kynast |
| 6,282,491 B1 | 8/2001 | Bochmann |
| 6,282,496 B1 | 8/2001 | Chowdhary |
| 6,295,454 B1 | 9/2001 | Havinis |
| 6,298,306 B1 | 10/2001 | Suarez |
| 6,304,758 B1 | 10/2001 | Iierbig |
| 6,307,629 B1 | 10/2001 | Jung |
| 6,313,761 B1 | 11/2001 | Shinada |
| 6,314,369 B1 | 11/2001 | Ito |
| 6,314,406 B1 | 11/2001 | OHagan |
| 6,317,684 B1 | 11/2001 | Roeseler |
| 6,321,158 B1 | 11/2001 | DeLorme |
| 6,323,846 B1 | 11/2001 | Westerman |
| 6,324,692 B1 | 11/2001 | Fiske |
| 6,326,918 B1 | 12/2001 | Stewart |
| 6,332,127 B1 | 12/2001 | Bandera |
| 6,339,437 B1 | 1/2002 | Nielsen |
| 6,343,317 B1 | 1/2002 | Glorikian |
| 6,345,288 B1 | 2/2002 | Reed |
| 6,351,235 B1 | 2/2002 | Stilp |
| 6,353,398 B1 | 3/2002 | Amin |
| 6,353,743 B1 | 3/2002 | Karmel |
| 6,353,837 B1 | 3/2002 | Blumenau |
| 6,356,761 B1 | 3/2002 | Huttunen |
| 6,356,763 B1 | 3/2002 | Kangas |
| 6,356,836 B1 | 3/2002 | Adolph |
| 6,356,838 B1 | 3/2002 | Paul |
| 6,370,629 B1 | 4/2002 | Hastings |
| 6,377,886 B1 | 4/2002 | Gotou |
| 6,381,465 B1 | 4/2002 | Chern |
| 6,381,539 B1 | 4/2002 | Shimazu |
| 6,381,603 B1 | 4/2002 | Chan |
| 6,385,458 B1 | 5/2002 | Papadimitriou |
| 6,385,465 B1 | 5/2002 | Yoshioka |
| 6,385,535 B2 | 5/2002 | Ohishi |
| 6,389,288 B1 | 5/2002 | Kuwahara |
| 6,401,032 B1 | 6/2002 | Jamison |
| 6,405,034 B1 | 6/2002 | Tijerino |
| 6,405,123 B1 | 6/2002 | Rennard |
| 6,411,899 B2 | 6/2002 | Dussell |
| 6,414,635 B1 | 7/2002 | Stewart |
| 6,415,207 B1 | 7/2002 | Jones |
| 6,415,220 B1 | 7/2002 | Kovacs |
| 6,415,227 B1 | 7/2002 | Lin |
| 6,427,115 B1 | 7/2002 | Sekiyama |
| 6,430,411 B1 | 8/2002 | Lempio |
| 6,434,530 B1 | 8/2002 | Sloane |
| 6,438,490 B2 | 8/2002 | Ohta |
| 6,449,485 B1 | 9/2002 | Anzil |
| 6,452,498 B2 | 9/2002 | Stewart |
| 6,456,234 B1 | 9/2002 | Johnson |
| 6,456,956 B1 | 9/2002 | Xiong |
| 6,459,782 B1 | 10/2002 | Bedrosian |
| 6,463,289 B1 | 10/2002 | Havinis |
| 6,477,581 B1 | 11/2002 | Carpenter |
| 6,487,305 B2 | 11/2002 | Kambe |
| 6,490,454 B1 | 12/2002 | Kangas |
| 6,490,519 B1 | 12/2002 | Lapidot |
| 6,501,421 B1 | 12/2002 | Dutta |
| 6,505,046 B1 | 1/2003 | Baker |
| 6,505,048 B1 | 1/2003 | Moles |
| 6,505,123 B1 | 1/2003 | Root |
| 6,507,802 B1 | 1/2003 | Payton |
| 6,516,197 B2 | 2/2003 | Havinis |
| 6,519,463 B2 | 2/2003 | Tendler |
| 6,526,335 B1 | 2/2003 | Treyz |
| 6,529,143 B2 | 3/2003 | Mikkola |
| 6,535,140 B1 | 3/2003 | Goss |
| 6,542,812 B1 | 4/2003 | Obradovich |
| 6,542,819 B1 | 4/2003 | Kovacs |
| 6,546,360 B1 | 4/2003 | Gilbert |
| 6,552,682 B1 | 4/2003 | Fan |
| 6,563,430 B1 | 5/2003 | Kemink |
| 6,564,143 B1 | 5/2003 | Alewine |
| 6,570,557 B1 | 5/2003 | Westerman |
| 6,571,279 B1 | 5/2003 | Herz |
| 6,574,484 B1 | 6/2003 | Carley |
| 6,587,688 B1 | 7/2003 | Chambers |
| 6,587,782 B1 | 7/2003 | Nocek |
| 6,587,835 B1 | 7/2003 | Treyz |
| 6,594,480 B1 | 7/2003 | Montalvo |
| 6,597,305 B2 | 7/2003 | Szeto |
| 6,611,687 B1 | 8/2003 | Clark |
| 6,611,788 B1 | 8/2003 | Hussa |
| 6,615,131 B1 | 9/2003 | Rennard |
| 6,615,213 B1 | 9/2003 | Johnson |

(56) References Cited

U.S. PATENT DOCUMENTS

| | | |
|---|---|---|
| 6,647,257 B2 | 11/2003 | Owensby |
| 6,650,902 B1 | 11/2003 | Richton |
| 6,662,023 B1 | 12/2003 | Helle |
| 6,667,963 B1 | 12/2003 | Rantalainen |
| 6,671,377 B1 | 12/2003 | Havinis |
| 6,674,849 B1 | 1/2004 | Froeberg |
| 6,677,894 B2 | 1/2004 | Sheynblat |
| 6,679,932 B2 | 1/2004 | Birler |
| 6,680,694 B1 | 1/2004 | Knockeart |
| 6,681,120 B1 | 1/2004 | Kim |
| 6,683,538 B1 | 1/2004 | Wilkes, Jr. |
| 6,697,018 B2 | 2/2004 | Stewart |
| 6,711,408 B1 | 3/2004 | Raith |
| 6,711,474 B1 | 3/2004 | Treyz |
| 6,718,344 B2 | 4/2004 | Hirono |
| 6,721,572 B1 | 4/2004 | Smith |
| 6,731,236 B1 | 5/2004 | Hager |
| 6,731,238 B2 | 5/2004 | Johnson |
| 6,738,808 B1 | 5/2004 | Zellner |
| 6,741,188 B1 | 5/2004 | Miller |
| 6,741,926 B1 | 5/2004 | Zhao |
| 6,748,226 B1 | 6/2004 | Wortham |
| 6,748,318 B1 | 6/2004 | Jones |
| 6,750,883 B1 | 6/2004 | Parupudi |
| 6,759,960 B2 | 7/2004 | Stewart |
| 6,762,772 B1 | 7/2004 | Imamura |
| 6,766,174 B1 | 7/2004 | Kenyon |
| 6,782,278 B2 | 8/2004 | Chen |
| 6,789,012 B1 | 9/2004 | Childs |
| 6,795,686 B2 | 9/2004 | Master |
| 6,810,323 B1 | 10/2004 | Bullock |
| 6,813,501 B2 | 11/2004 | Kinnunen |
| 6,813,503 B1 | 11/2004 | Zillikens |
| 6,816,782 B1 | 11/2004 | Walters |
| 6,819,919 B1 | 11/2004 | Tanaka |
| 6,823,188 B1 | 11/2004 | Stern |
| 6,845,318 B1 | 1/2005 | Moore |
| 6,847,891 B2 | 1/2005 | Pietras |
| 6,847,969 B1 | 1/2005 | Mathai |
| 6,853,911 B1 | 2/2005 | Sakarya |
| 6,853,917 B2 | 2/2005 | Miwa |
| 6,859,149 B1 | 2/2005 | Ohta |
| 6,865,483 B1 | 3/2005 | Cook, III |
| 6,868,074 B1 | 3/2005 | Hanson |
| 6,871,144 B1 | 3/2005 | Lee |
| 6,882,313 B1 | 4/2005 | Fan |
| 6,888,536 B2 | 5/2005 | Westerman |
| 6,909,902 B1 | 6/2005 | Sawada |
| 6,912,398 B1 | 6/2005 | Domnitz |
| 6,914,626 B2 | 7/2005 | Squibbs |
| 6,915,208 B2 | 7/2005 | Garin |
| 6,933,841 B2 | 8/2005 | Muramatsu |
| 6,944,447 B2 | 9/2005 | Portman |
| 6,948,656 B2 | 9/2005 | Williams |
| 6,952,181 B2 | 10/2005 | Karr |
| 6,954,735 B1 | 10/2005 | Djupsjobacka |
| 6,957,072 B2 | 10/2005 | Kangras |
| 6,975,959 B2 | 12/2005 | Dietrich |
| 6,980,909 B2 | 12/2005 | Root |
| 6,990,495 B1 | 1/2006 | Grason |
| 6,999,779 B1 | 2/2006 | Hashimoto |
| 7,003,289 B1 | 2/2006 | Kolls |
| 7,009,556 B2 | 3/2006 | Stewart |
| 7,031,725 B2 | 4/2006 | Rorabaugh |
| 7,044,372 B2 | 5/2006 | Okuda |
| 7,058,594 B2 | 6/2006 | Stewart |
| 7,076,255 B2 | 7/2006 | Parupudi |
| 7,082,365 B2 | 7/2006 | Sheha |
| 7,089,264 B1 | 8/2006 | Guido |
| 7,096,029 B1 | 8/2006 | Parupudi |
| 7,096,030 B2 | 8/2006 | Huomo |
| 7,103,470 B2 | 9/2006 | Mintz |
| 7,117,015 B2 | 10/2006 | Scheinert |
| 7,120,469 B1 | 10/2006 | Urakawa |
| 7,123,189 B2 | 10/2006 | Lalik |
| 7,123,926 B2 | 10/2006 | Himmelstein |
| 7,146,298 B2 | 12/2006 | Motamedi |
| 7,151,921 B2 | 12/2006 | Otsuka |
| 7,165,725 B2 | 1/2007 | Casey |
| 7,171,190 B2 | 1/2007 | Ye |
| 7,181,189 B2 | 2/2007 | Hotta |
| 7,187,997 B2 | 3/2007 | Johnson |
| 7,200,409 B1 | 4/2007 | Ichikawa |
| 7,200,566 B1 | 4/2007 | Moore |
| 7,213,048 B1 | 5/2007 | Parupudi |
| 7,215,967 B1 | 5/2007 | Kransmo |
| 7,236,883 B2 | 6/2007 | Garin |
| 7,254,481 B2 | 8/2007 | Yamada |
| 7,256,711 B2 | 8/2007 | Sheha |
| 7,257,392 B2 | 8/2007 | Tang |
| 7,260,378 B2 | 8/2007 | Holland |
| 7,266,376 B2 | 9/2007 | Nakagawa |
| 7,269,601 B2 | 9/2007 | Kinno |
| 7,271,765 B2 | 9/2007 | Stilp |
| 7,272,404 B2 | 9/2007 | Overy |
| 7,274,332 B1 | 9/2007 | Dupray |
| 7,274,939 B2 | 9/2007 | Ruutu |
| 7,280,822 B2 | 10/2007 | Fraccaroli |
| 7,286,396 B2 | 10/2007 | Yang |
| 7,295,556 B2 | 11/2007 | Roese |
| 7,295,925 B2 | 11/2007 | Breed |
| 7,298,327 B2 | 11/2007 | Dupray |
| 7,299,008 B2 | 11/2007 | Gluck |
| 7,310,516 B1 | 12/2007 | Vacanti |
| 7,313,467 B2 | 12/2007 | Breed |
| 7,336,949 B2 | 2/2008 | Nasielski |
| 7,339,496 B2 | 3/2008 | Endo |
| 7,343,564 B2 | 3/2008 | Othmer |
| 7,349,706 B2 | 3/2008 | Kim |
| 7,359,713 B1 | 4/2008 | Tiwari |
| 7,370,283 B2 | 5/2008 | Othmer |
| 7,373,246 B2 | 5/2008 | OClair |
| 7,386,396 B2 | 6/2008 | Johnson |
| 7,389,179 B2 | 6/2008 | Jin |
| 7,395,031 B1 | 7/2008 | Ritter |
| 7,418,402 B2 | 8/2008 | McCrossin |
| 7,421,422 B1 | 9/2008 | Dempster |
| 7,421,486 B1 | 9/2008 | Parupudi |
| 7,426,437 B2 | 9/2008 | Breed |
| 7,427,021 B2 | 9/2008 | Kemper |
| 7,440,842 B1 | 10/2008 | Vorona |
| 7,483,944 B2 | 1/2009 | Parupudi |
| 7,486,201 B2 | 2/2009 | Kelly |
| 7,500,607 B2 | 3/2009 | Williams |
| 7,512,487 B1 | 3/2009 | Golding |
| 7,522,927 B2 | 4/2009 | Fitch |
| 7,525,484 B2 | 4/2009 | Dupray |
| 7,545,281 B2 | 6/2009 | Richards |
| 7,558,696 B2 | 7/2009 | Vilppula |
| 7,565,132 B2 | 7/2009 | Ben Ayed |
| 7,565,157 B1 | 7/2009 | Ortega |
| 7,574,222 B2 | 8/2009 | Sawada |
| 7,577,448 B2 | 8/2009 | Pande |
| 7,587,345 B2 | 9/2009 | Mann |
| 7,593,991 B2 | 9/2009 | Friedman |
| 7,599,795 B1 | 10/2009 | Blumberg |
| 7,603,233 B2 | 10/2009 | Tashiro |
| 7,606,580 B2 | 10/2009 | Granito |
| 7,617,044 B2 | 11/2009 | Lee |
| 7,620,404 B2 | 11/2009 | Chesnais |
| 7,623,848 B2 | 11/2009 | Rosenfelt |
| 7,647,174 B2 | 1/2010 | Kwon |
| 7,680,591 B2 | 3/2010 | Nagata |
| 7,689,916 B1 | 3/2010 | Goel |
| 7,710,290 B2 | 5/2010 | Johnson |
| 7,711,478 B2 | 5/2010 | Gluck |
| 7,714,778 B2 | 5/2010 | Dupray |
| 7,743,074 B1 | 6/2010 | Parupudi |
| 7,756,639 B2 | 7/2010 | Colley |
| 7,768,395 B2 | 8/2010 | Gold |
| 7,792,273 B2 | 9/2010 | Fano |
| 7,811,203 B2 | 10/2010 | Unuma |
| 7,823,073 B2 | 10/2010 | Holmes |
| 7,848,765 B2 | 12/2010 | Phillips |

(56) References Cited

U.S. PATENT DOCUMENTS

| | | |
|---|---|---|
| 7,860,758 B2 | 12/2010 | McCrossin |
| 7,890,123 B2 | 2/2011 | Granito |
| 7,933,612 B2 | 4/2011 | Counts |
| 7,979,350 B1 | 7/2011 | Carion |
| 8,046,009 B2 | 10/2011 | Bodmer |
| 8,260,320 B2 | 9/2012 | Herz |
| 8,359,643 B2 | 1/2013 | Low |
| 8,571,580 B2 | 10/2013 | Altman |
| 8,660,530 B2 | 2/2014 | Sharp |
| 8,666,367 B2 | 3/2014 | Sharp |
| 2001/0018349 A1 | 8/2001 | Kinnunen |
| 2002/0032035 A1 | 3/2002 | Teshima |
| 2002/0035493 A1 | 3/2002 | Mozayeny |
| 2002/0035609 A1 | 3/2002 | Lessard |
| 2002/0042266 A1 | 4/2002 | Heyward |
| 2002/0046069 A1 | 4/2002 | Mozayeny |
| 2002/0046077 A1 | 4/2002 | Mozayeny |
| 2002/0046084 A1 | 4/2002 | Steele |
| 2002/0067353 A1 | 6/2002 | Kenyon |
| 2002/0077144 A1 | 6/2002 | Keller |
| 2002/0087505 A1 | 7/2002 | Smith |
| 2002/0091991 A1 | 7/2002 | Castro |
| 2002/0095486 A1 | 7/2002 | Bahl |
| 2002/0095567 A1 | 7/2002 | Royer |
| 2002/0126146 A1 | 9/2002 | Burns |
| 2002/0128773 A1 | 9/2002 | Chowanic |
| 2002/0132625 A1 | 9/2002 | Ogino |
| 2002/0140560 A1 | 10/2002 | Altman |
| 2002/0160815 A1 | 10/2002 | Patel |
| 2002/0167442 A1 | 11/2002 | Taylor |
| 2002/0169539 A1 | 11/2002 | Menard |
| 2002/0173905 A1 | 11/2002 | Jin |
| 2003/0014181 A1 | 1/2003 | Myr |
| 2003/0016804 A1 | 1/2003 | Sheha |
| 2003/0018746 A1 | 1/2003 | Boesch |
| 2003/0032404 A1 | 2/2003 | Wager |
| 2003/0050933 A1 | 3/2003 | DeSalvo |
| 2003/0060212 A1 | 3/2003 | Thomas |
| 2003/0060215 A1 | 3/2003 | Graham |
| 2003/0060973 A1 | 3/2003 | Mathews |
| 2003/0065934 A1 | 4/2003 | Angelo |
| 2003/0069683 A1 | 4/2003 | Lapidot |
| 2003/0078054 A1 | 4/2003 | Okuda |
| 2003/0078055 A1 | 4/2003 | Smith |
| 2003/0078057 A1 | 4/2003 | Watanabe |
| 2003/0096620 A1 | 5/2003 | Ozturk |
| 2003/0100326 A1 | 5/2003 | Grube |
| 2003/0100334 A1 | 5/2003 | Mazzara |
| 2003/0101225 A1 | 5/2003 | Han |
| 2003/0134657 A1 | 7/2003 | Norta |
| 2003/0140136 A1 | 7/2003 | Nakamura |
| 2003/0144793 A1 | 7/2003 | Melaku |
| 2003/0148774 A1 | 8/2003 | Naghian |
| 2003/0158655 A1 | 8/2003 | Obradovich |
| 2003/0191578 A1 | 10/2003 | Paulauskas |
| 2003/0236106 A1 | 12/2003 | Master |
| 2004/0010358 A1 | 1/2004 | Oesterling |
| 2004/0036649 A1 | 2/2004 | Taylor |
| 2004/0054428 A1 | 3/2004 | Sheha |
| 2004/0059502 A1 | 3/2004 | Levi |
| 2004/0068439 A1 | 4/2004 | Elgrably |
| 2004/0072577 A1 | 4/2004 | Myllymaki |
| 2004/0073361 A1 | 4/2004 | Tzamaloukas |
| 2004/0083050 A1 | 4/2004 | Biyani |
| 2004/0104842 A1 | 6/2004 | Drury |
| 2004/0128067 A1 | 7/2004 | Smith |
| 2004/0151151 A1 | 8/2004 | Kubler |
| 2004/0158401 A1 | 8/2004 | Yoon |
| 2004/0158584 A1 | 8/2004 | Necsoiu |
| 2004/0172409 A1 | 9/2004 | James |
| 2004/0176907 A1 | 9/2004 | Nesbitt |
| 2004/0180669 A1 | 9/2004 | Kall |
| 2004/0192299 A1 | 9/2004 | Wilson |
| 2004/0198335 A1 | 10/2004 | Campen |
| 2004/0198379 A1 | 10/2004 | Magee |
| 2004/0198397 A1 | 10/2004 | Weiss |
| 2004/0203569 A1 | 10/2004 | Jijina |
| 2004/0203746 A1 | 10/2004 | Knauerhase |
| 2004/0203836 A1 | 10/2004 | Gorday |
| 2004/0203880 A1 | 10/2004 | Riley |
| 2004/0203909 A1 | 10/2004 | Koster |
| 2004/0215707 A1 | 10/2004 | Fujita |
| 2004/0228330 A1 | 11/2004 | Kubler |
| 2004/0236504 A1 | 11/2004 | Bickford |
| 2004/0242149 A1 | 12/2004 | Luneau |
| 2004/0246940 A1 | 12/2004 | Kubler |
| 2004/0248586 A1 | 12/2004 | Patel |
| 2004/0260939 A1 | 12/2004 | Ichikawa |
| 2004/0263084 A1 | 12/2004 | Mor |
| 2004/0264442 A1 | 12/2004 | Kubler |
| 2005/0002419 A1 | 1/2005 | Doviak |
| 2005/0004838 A1 | 1/2005 | Perkowski |
| 2005/0009511 A1 | 1/2005 | Bostrom |
| 2005/0027442 A1 | 2/2005 | Kelley |
| 2005/0037781 A1 | 2/2005 | Ozugur |
| 2005/0039140 A1 | 2/2005 | Chen |
| 2005/0046584 A1 | 3/2005 | Breed |
| 2005/0071078 A1 | 3/2005 | Yamada |
| 2005/0071702 A1 | 3/2005 | Morisawa |
| 2005/0075116 A1 | 4/2005 | Laird |
| 2005/0085272 A1 | 4/2005 | Anderson |
| 2005/0091408 A1 | 4/2005 | Parupudi |
| 2005/0096840 A1 | 5/2005 | Simske |
| 2005/0114021 A1 | 5/2005 | Krull |
| 2005/0130677 A1 | 6/2005 | Meunier |
| 2005/0134440 A1 | 6/2005 | Breed |
| 2005/0134578 A1 | 6/2005 | Chambers |
| 2005/0149250 A1 | 7/2005 | Isaac |
| 2005/0153681 A1 | 7/2005 | Hanson |
| 2005/0176411 A1 | 8/2005 | Taya |
| 2005/0197767 A1 | 9/2005 | Nortrup |
| 2005/0203698 A1 | 9/2005 | Lee |
| 2005/0221799 A1 | 10/2005 | Tervo |
| 2005/0221808 A1 | 10/2005 | Karlsson |
| 2005/0221843 A1 | 10/2005 | Friedman |
| 2005/0222756 A1 | 10/2005 | Davis |
| 2005/0222763 A1 | 10/2005 | Uyeki |
| 2005/0227709 A1 | 10/2005 | Chang |
| 2005/0228860 A1 | 10/2005 | Hamynen |
| 2005/0234637 A1 | 10/2005 | Obradovich |
| 2005/0239477 A1 | 10/2005 | Kim |
| 2005/0250440 A1 | 11/2005 | Zhou |
| 2005/0256639 A1 | 11/2005 | Aleksic |
| 2005/0286421 A1 | 12/2005 | Janacek |
| 2006/0009908 A1 | 1/2006 | Tomita |
| 2006/0015249 A1 | 1/2006 | Gieseke |
| 2006/0022048 A1 | 2/2006 | Johnson |
| 2006/0025158 A1 | 2/2006 | LeBlanc |
| 2006/0038719 A1 | 2/2006 | Pande |
| 2006/0041374 A1 | 2/2006 | Inoue |
| 2006/0041377 A1 | 2/2006 | Jung |
| 2006/0041378 A1 | 2/2006 | Cheng |
| 2006/0056388 A1 | 3/2006 | Livingood |
| 2006/0058955 A1 | 3/2006 | Mehren |
| 2006/0063539 A1 | 3/2006 | Beyer |
| 2006/0069503 A1 | 3/2006 | Suomela |
| 2006/0085392 A1 | 4/2006 | Wang |
| 2006/0094353 A1 | 5/2006 | Nielsen |
| 2006/0101005 A1 | 5/2006 | Yang |
| 2006/0111122 A1 | 5/2006 | Carlson |
| 2006/0116137 A1 | 6/2006 | Jung |
| 2006/0148463 A1 | 7/2006 | Zhu |
| 2006/0150119 A1 | 7/2006 | Chesnais |
| 2006/0166679 A1 | 7/2006 | Karaoguz |
| 2006/0172769 A1 | 8/2006 | Oh |
| 2006/0172778 A1 | 8/2006 | Sundararajan |
| 2006/0179114 A1 | 8/2006 | Deeds |
| 2006/0180649 A1 | 8/2006 | Casey |
| 2006/0184978 A1 | 8/2006 | Casey |
| 2006/0195481 A1 | 8/2006 | Arrouye |
| 2006/0202819 A1 | 9/2006 | Adamczyk |
| 2006/0211453 A1 | 9/2006 | Schick |
| 2006/0218209 A1 | 9/2006 | Arrouye |
| 2006/0223518 A1 | 10/2006 | Haney |

(56) References Cited

U.S. PATENT DOCUMENTS

| | | |
|---|---|---|
| 2006/0229802 A1 | 10/2006 | Vertelney |
| 2006/0237385 A1 | 10/2006 | Baker |
| 2006/0247855 A1 | 11/2006 | Silva |
| 2006/0270421 A1 | 11/2006 | Phillips |
| 2006/0271280 A1 | 11/2006 | OClair |
| 2006/0284767 A1 | 12/2006 | Taylor |
| 2006/0287824 A1 | 12/2006 | Lin |
| 2006/0291639 A1 | 12/2006 | Radziewicz |
| 2006/0293083 A1 | 12/2006 | Bowen |
| 2007/0001875 A1 | 1/2007 | Taylor |
| 2007/0003040 A1 | 1/2007 | Radziewicz |
| 2007/0005118 A1 | 1/2007 | Carter |
| 2007/0005188 A1 | 1/2007 | Johnson |
| 2007/0005233 A1 | 1/2007 | Pinkus |
| 2007/0006098 A1 | 1/2007 | Krumm |
| 2007/0008515 A1 | 1/2007 | Otani |
| 2007/0010942 A1 | 1/2007 | Bill |
| 2007/0016362 A1 | 1/2007 | Nelson |
| 2007/0027614 A1 | 2/2007 | Reeser |
| 2007/0027628 A1 | 2/2007 | Geelen |
| 2007/0042790 A1 | 2/2007 | Mohi |
| 2007/0055684 A1 | 3/2007 | Stevens |
| 2007/0061245 A1 | 3/2007 | Ramer |
| 2007/0061301 A1 | 3/2007 | Ramer |
| 2007/0061363 A1 | 3/2007 | Ramer |
| 2007/0071114 A1 | 3/2007 | Sanderford |
| 2007/0073480 A1 | 3/2007 | Singh |
| 2007/0073719 A1 | 3/2007 | Ramer |
| 2007/0093258 A1 | 4/2007 | Steenstra |
| 2007/0106465 A1 | 5/2007 | Adam |
| 2007/0115868 A1 | 5/2007 | Chen |
| 2007/0124043 A1 | 5/2007 | Ayoub |
| 2007/0124066 A1 | 5/2007 | Kikuchi |
| 2007/0127439 A1 | 6/2007 | Stein |
| 2007/0127661 A1 | 6/2007 | Didcock |
| 2007/0129888 A1 | 6/2007 | Rosenberg |
| 2007/0130153 A1 | 6/2007 | Nachman |
| 2007/0135136 A1 | 6/2007 | Ische |
| 2007/0135990 A1 | 6/2007 | Seymour |
| 2007/0136279 A1 | 6/2007 | Zhou |
| 2007/0149212 A1 | 6/2007 | Gupta |
| 2007/0150320 A1 | 6/2007 | Huang |
| 2007/0153983 A1 | 7/2007 | Bloebaum |
| 2007/0153984 A1 | 7/2007 | Bloebaum |
| 2007/0153986 A1 | 7/2007 | Bloebaum |
| 2007/0155360 A1 | 7/2007 | An |
| 2007/0156326 A1 | 7/2007 | Nesbitt |
| 2007/0179854 A1 | 8/2007 | Ziv |
| 2007/0184855 A1 | 8/2007 | Klassen |
| 2007/0191029 A1 | 8/2007 | Zarem |
| 2007/0200713 A1 | 8/2007 | Weber |
| 2007/0204218 A1 | 8/2007 | Weber |
| 2007/0206730 A1 | 9/2007 | Polk |
| 2007/0208492 A1 | 9/2007 | Downs |
| 2007/0208497 A1 | 9/2007 | Downs |
| 2007/0208498 A1 | 9/2007 | Barker |
| 2007/0218925 A1 | 9/2007 | Islam |
| 2007/0219706 A1 | 9/2007 | Sheynblat |
| 2007/0229549 A1 | 10/2007 | Dicke |
| 2007/0232272 A1 | 10/2007 | Gonsalves |
| 2007/0232326 A1 | 10/2007 | Johnson |
| 2007/0233387 A1 | 10/2007 | Johnson |
| 2007/0238491 A1 | 10/2007 | He |
| 2007/0247435 A1 | 10/2007 | Benko |
| 2007/0254676 A1 | 11/2007 | Pedigo |
| 2007/0259674 A1 | 11/2007 | Neef |
| 2007/0260751 A1 | 11/2007 | Meesseman |
| 2007/0266116 A1 | 11/2007 | Rensin |
| 2007/0271328 A1 | 11/2007 | Geelen |
| 2007/0276586 A1 | 11/2007 | Jeon |
| 2007/0276587 A1 | 11/2007 | Johnson |
| 2007/0276596 A1 | 11/2007 | Solomon |
| 2007/0281664 A1 | 12/2007 | Kaneko |
| 2007/0282521 A1 | 12/2007 | Broughton |
| 2007/0282565 A1 | 12/2007 | Bye |
| 2007/0288859 A1 | 12/2007 | Vuong |
| 2007/0290920 A1 | 12/2007 | Shintai |
| 2007/0299601 A1 | 12/2007 | Zhao |
| 2008/0004789 A1 | 1/2008 | Horvitz |
| 2008/0004802 A1 | 1/2008 | Horvitz |
| 2008/0005104 A1 | 1/2008 | Flake |
| 2008/0005301 A1 | 1/2008 | Li |
| 2008/0015422 A1 | 1/2008 | Wessel |
| 2008/0021632 A1 | 1/2008 | Amano |
| 2008/0024360 A1 | 1/2008 | Taylor |
| 2008/0024364 A1 | 1/2008 | Taylor |
| 2008/0027636 A1 | 1/2008 | Tengler |
| 2008/0030308 A1 | 2/2008 | Johnson |
| 2008/0032703 A1 | 2/2008 | Krumm |
| 2008/0032721 A1 | 2/2008 | Macdonald |
| 2008/0045234 A1 | 2/2008 | Reed |
| 2008/0046176 A1 | 2/2008 | Jurgens |
| 2008/0052407 A1 | 2/2008 | Baudino |
| 2008/0065311 A1 | 3/2008 | Bauchot |
| 2008/0070593 A1 | 3/2008 | Altman |
| 2008/0071466 A1 | 3/2008 | Downs |
| 2008/0082254 A1 | 4/2008 | Huhtala |
| 2008/0085727 A1 | 4/2008 | Kratz |
| 2008/0086240 A1 | 4/2008 | Breed |
| 2008/0088486 A1 | 4/2008 | Rozum |
| 2008/0091347 A1 | 4/2008 | Tashiro |
| 2008/0097698 A1 | 4/2008 | Arnold-Huyser |
| 2008/0098090 A1 | 4/2008 | Geraci |
| 2008/0104634 A1 | 5/2008 | Gajdos |
| 2008/0109153 A1 | 5/2008 | Gueziec |
| 2008/0113672 A1 | 5/2008 | Karr |
| 2008/0129528 A1 | 6/2008 | Guthrie |
| 2008/0132243 A1 | 6/2008 | Spalink |
| 2008/0132251 A1 | 6/2008 | Altman |
| 2008/0132252 A1 | 6/2008 | Altman |
| 2008/0140308 A1 | 6/2008 | Yamane |
| 2008/0140520 A1 | 6/2008 | Ryder |
| 2008/0153512 A1 | 6/2008 | Kale |
| 2008/0153513 A1 | 6/2008 | Flake |
| 2008/0155453 A1 | 6/2008 | Othmer |
| 2008/0161034 A1 | 7/2008 | Akiyama |
| 2008/0167083 A1 | 7/2008 | Wyld |
| 2008/0167796 A1 | 7/2008 | Narayanaswami |
| 2008/0167811 A1 | 7/2008 | Geelen |
| 2008/0171555 A1 | 7/2008 | Oh |
| 2008/0172173 A1 | 7/2008 | Chang |
| 2008/0172374 A1 | 7/2008 | Wolosin |
| 2008/0176545 A1 | 7/2008 | Dicke |
| 2008/0177793 A1 | 7/2008 | Epstein |
| 2008/0178116 A1 | 7/2008 | Kim |
| 2008/0186162 A1 | 8/2008 | Rajan |
| 2008/0189033 A1 | 8/2008 | Geelen |
| 2008/0194273 A1 | 8/2008 | Kansai |
| 2008/0200142 A1 | 8/2008 | Abdel-Kader |
| 2008/0207167 A1 | 8/2008 | Bugenhagen |
| 2008/0225779 A1 | 9/2008 | Bragiel |
| 2008/0227473 A1 | 9/2008 | Haney |
| 2008/0233919 A1 | 9/2008 | Kenney |
| 2008/0248815 A1 | 10/2008 | Busch |
| 2008/0249667 A1 | 10/2008 | Horvitz |
| 2008/0268876 A1 | 10/2008 | Gelfand |
| 2008/0271072 A1 | 10/2008 | Rothschild |
| 2008/0284642 A1 | 11/2008 | Seacat |
| 2008/0287124 A1 | 11/2008 | Karabinis |
| 2008/0310850 A1 | 12/2008 | Pederson |
| 2008/0318550 A1 | 12/2008 | DeAtley |
| 2008/0319644 A1 | 12/2008 | Zehler |
| 2008/0319652 A1 | 12/2008 | Moshfeghi |
| 2009/0003659 A1 | 1/2009 | Forstall |
| 2009/0005005 A1 | 1/2009 | Forstall |
| 2009/0005018 A1 | 1/2009 | Forstall |
| 2009/0005021 A1 | 1/2009 | Forstall |
| 2009/0005068 A1 | 1/2009 | Forstall |
| 2009/0005070 A1 | 1/2009 | Forstall |
| 2009/0005071 A1 | 1/2009 | Forstall |
| 2009/0005072 A1 | 1/2009 | Forstall |
| 2009/0005076 A1 | 1/2009 | Forstall |
| 2009/0005080 A1 | 1/2009 | Forstall |
| 2009/0005082 A1 | 1/2009 | Forstall |

(56) References Cited

U.S. PATENT DOCUMENTS

| | | |
|---|---|---|
| 2009/0005964 A1 | 1/2009 | Forstall |
| 2009/0005965 A1 | 1/2009 | Forstall |
| 2009/0005975 A1 | 1/2009 | Forstall |
| 2009/0005978 A1 | 1/2009 | Forstall |
| 2009/0005981 A1 | 1/2009 | Forstall |
| 2009/0006336 A1 | 1/2009 | Forstall |
| 2009/0030605 A1 | 1/2009 | Breed |
| 2009/0031006 A1 | 1/2009 | Johnson |
| 2009/0033540 A1 | 2/2009 | Breed |
| 2009/0042585 A1 | 2/2009 | Matsuda |
| 2009/0061793 A1 | 3/2009 | Jung |
| 2009/0089706 A1 | 4/2009 | Furches |
| 2009/0094377 A1 | 4/2009 | Zahavi |
| 2009/0098857 A1 | 4/2009 | Atley |
| 2009/0143048 A1 | 6/2009 | Ayanamcottil |
| 2009/0170538 A1 | 7/2009 | Shrivathsan |
| 2009/0177385 A1 | 7/2009 | Matas |
| 2009/0182492 A1 | 7/2009 | Alten |
| 2009/0201850 A1 | 8/2009 | Davis |
| 2009/0215469 A1 | 8/2009 | Fisher |
| 2009/0228961 A1 | 9/2009 | Wald |
| 2009/0234743 A1 | 9/2009 | Wald |
| 2009/0259573 A1 | 10/2009 | Cheng |
| 2009/0271271 A1 | 10/2009 | Johnson |
| 2009/0281724 A1 | 11/2009 | Blumenberg |
| 2009/0286549 A1 | 11/2009 | Canon |
| 2009/0326815 A1 | 12/2009 | Williamson |
| 2010/0082820 A1 | 4/2010 | Furukawa |
| 2010/0131584 A1 | 5/2010 | Johnson |
| 2010/0173647 A1 | 7/2010 | Sheynblat |
| 2010/0207782 A1 | 8/2010 | Johnson |
| 2011/0051658 A1 | 3/2011 | Jin |

FOREIGN PATENT DOCUMENTS

| | | |
|---|---|---|
| CA | 2432239 A1 | 12/2004 |
| CA | 2163215 A1 | 11/2009 |
| DE | 3621456 A1 | 1/1988 |
| DE | 4437360 A1 | 4/1996 |
| DE | 19506890 A1 | 8/1996 |
| DE | 69510141 T2 | 10/1999 |
| DE | 19914257 A1 | 1/2000 |
| DE | 10141695 A1 | 3/2003 |
| EP | 0288068 A1 | 10/1988 |
| EP | 0699330 A1 | 3/1996 |
| EP | 0745867 A1 | 12/1996 |
| EP | 0763749 A1 | 3/1997 |
| EP | 0785535 A1 | 7/1997 |
| EP | 0786646 A2 | 7/1997 |
| EP | 0809117 A2 | 11/1997 |
| EP | 0813072 A2 | 12/1997 |
| EP | 0908835 A2 | 4/1999 |
| EP | 0997808 A2 | 5/2000 |
| EP | 1083764 A2 | 3/2001 |
| EP | 1300652 A2 | 4/2003 |
| EP | 1457928 A1 | 9/2004 |
| EP | 1465041 A2 | 10/2004 |
| EP | 1469287 A2 | 10/2004 |
| EP | 1496338 A2 | 1/2005 |
| EP | 1659817 A2 | 5/2006 |
| EP | 1770956 A1 | 4/2007 |
| EP | 1790947 A1 | 5/2007 |
| EP | 1860904 A1 | 11/2007 |
| EP | 1933249 A1 | 6/2008 |
| FR | 2272911 A1 | 12/1975 |
| FR | 2730083 A1 | 8/1996 |
| FR | 2754093 A1 | 4/1998 |
| FR | 2810183 A1 | 12/2001 |
| GB | 2278196 A | 11/1994 |
| GB | 2322248 A | 8/1998 |
| GB | 2359888 A | 9/2001 |
| GB | 2407230 A | 4/2005 |
| JP | S621042215 A | 6/1987 |
| JP | H05071974 A | 3/1993 |
| JP | H08069436 A | 3/1996 |
| JP | H09054895 A | 2/1997 |
| JP | H09062993 A | 3/1997 |
| JP | H09113288 A | 5/1997 |
| JP | H09153125 A | 6/1997 |
| JP | H09200850 A | 7/1997 |
| JP | H09210710 A | 8/1997 |
| JP | H09319300 A | 12/1997 |
| JP | H10021259 A | 1/1998 |
| JP | H10030933 A | 2/1998 |
| JP | H11234736 A | 8/1999 |
| JP | 2000163379 A | 6/2000 |
| JP | 2001160063 A | 6/2001 |
| JP | 2002310680 A | 10/2002 |
| JP | 2003228532 A | 8/2003 |
| JP | 2004045054 A | 2/2004 |
| JP | 2004219146 A | 8/2004 |
| JP | 2004362271 A | 12/2004 |
| JP | 2005106741 A | 4/2005 |
| JP | 2005182146 A | 7/2005 |
| JP | 2005241519 A | 9/2005 |
| JP | 2006112338 A | 4/2006 |
| JP | 2006184007 A | 7/2006 |
| JP | 2006270889 A | 10/2006 |
| JP | 2006279838 A | 10/2006 |
| JP | 2007033220 A | 2/2007 |
| JP | 2007033331 A | 2/2007 |
| JP | 2007033368 A | 2/2007 |
| JP | 2007127439 A | 5/2007 |
| JP | 2007147439 A | 6/2007 |
| JP | 2007201699 A | 8/2007 |
| JP | 2007221433 A | 8/2007 |
| JP | 2007240400 A | 9/2007 |
| JP | 2007259291 A | 10/2007 |
| JP | 2007271299 A | 10/2007 |
| JP | 2007304009 A | 11/2007 |
| JP | 2008058917 A | 3/2008 |
| JP | 2008129774 A | 6/2008 |
| JP | 2015127439 A | 10/2015 |
| JP | 2015525189 A | 10/2015 |
| KR | 2004102440 A | 12/2004 |
| KR | 2005096746 A | 10/2005 |
| TW | 200426387 A | 12/2004 |
| WO | 9320546 A1 | 10/1993 |
| WO | 9408250 A1 | 4/1994 |
| WO | 9707467 A1 | 2/1997 |
| WO | 9724577 A2 | 7/1997 |
| WO | 9741654 A1 | 11/1997 |
| WO | 9803951 A1 | 1/1998 |
| WO | 9807112 A2 | 2/1998 |
| WO | 9854682 A1 | 12/1998 |
| WO | 9916036 A1 | 4/1999 |
| WO | 9944183 A1 | 9/1999 |
| WO | 9961934 A1 | 12/1999 |
| WO | 2001037597 A1 | 1/2001 |
| WO | 0131966 A1 | 5/2001 |
| WO | 02054813 A1 | 1/2002 |
| WO | 03023593 A1 | 1/2003 |
| WO | 03096055 A2 | 1/2003 |
| WO | 2004008792 A1 | 12/2003 |
| WO | 2004021730 A1 | 12/2003 |
| WO | 2004061576 A2 | 1/2004 |
| WO | 2004076977 A1 | 1/2004 |
| WO | 2005006258 A1 | 1/2005 |
| WO | 2005084052 A1 | 1/2005 |
| WO | 2006065856 A1 | 1/2006 |
| WO | 2006113125 A2 | 2/2006 |
| WO | 2007027065 A1 | 1/2007 |
| WO | 2007052285 A2 | 1/2007 |
| WO | 2008051929 A2 | 1/2008 |
| WO | 2008085740 A2 | 1/2008 |
| WO | 2009140031 A1 | 1/2009 |

OTHER PUBLICATIONS

Gunnarsson et al., 'Location Trial System for Mobile Phones,' IEEE, Nov. 1998, pp. 2211-2216.

(56) References Cited

OTHER PUBLICATIONS

Guo et al., 'An Intelligent Query System based on Chinese Short Message Service for Restaurant Recommendation', IEEE Jul. 2007, 1 page.

Hameed et al., 'An Intelligent Agent-Based Medication and Emergency System', IEEE Apr. 2006.

Helal et al., 'Drishti: An Integrated Navigation System for Visually Impaired and Disabled', Fifth International Symposium on Wearable Computers (ISWC'01), IEEE, Oct. 2001, pp. 149-156.

Hodes and Katz, 'Composable ad hoc location-based services for heterogeneous mobile clients,' Wireless Networks, Oct. 1999,5:411-427.

Hohman et al., 'GPS Roadside Integrated Precision Positioning System', Position Location and Navigation Symposium (IEEE 2000), pp. 221-230.

Hoogenraad, 'Location Dependent Services,' 3rd AGILE Conference on Geographic Information Science, Helsinki/Espoo, Finland, May 25-27, 2000, pp. 74-77.

International Numbering and SMS—Type of Numbering, TON, Numbering Plan Indicator, NPI', [online] [Retrieved 01/0512007] Retrieved from the Internet <URL: http://www.activeexperts.com/support/activsms/tonnpi/.

Jirawimut et al., 'A Method for Dead Reckoning Parameter Correction in Pedestrian Navigation System', IEEE Transactions on Instrumentation and Measurement, vol. 52, No. 1, Feb. 2003, pp. 209-215.

Jose and Davies, 'Scalabe and Flexible Location-Based Services for Ubiquitous Information Access,' HUC'99, LNCS 1707, Sep. 1999, pp. 52-66.

Ju et al., 'RFID Data Collection and Integration based on Mobile Agent', IEEE, Jun. 2006.

Kbar et al., 'Mobile Station Location based on Hybrid of Signal Strength and Time of Arrival', IEEE, Jul. 2005.

Khattak et al., 'Bay Area ATIS Testbed Plan,' Research Reports, California Partners for Advanced Transit and Highways (PATH), Institute of Transportation Studies, UC Berkeley, Jan. 1, 1992, 83 pages.

Klinec and Nolz, 'Nexus-Positioning and Communication Environment for Spatially Aware Applications,' IAPRS, Amsterdam, Jul. 2000, 7 pages.

Koide et al., '3-D Human Navigation System with Consideration of Neighboring Space Information', IEEE International Conference on Systems, Man and Cybernetics, 2006 (SMC '06), vol. 2, (Oct. 8-11, 2006), pp. 1693-1698.

Kovacs et al., 'Adaptive Mobile Access to Context-aware Services,' Proc. ASAMA '99 Proc. First International Symposium on Agent Systems and Applications Third International Symposium on Mobile Agents, IEEE Computer Society Washington, DC, Oct. 1999, 12 pages.

Kreller et al., 'A Mobile-Aware City Guide Application,' ACTS Mobile Communication Summit, Jun. 1998, Rhodes, Greece, 7 pages.

Kreller et al., 'UMTS: A Middleware Architecture and Mobile API/Approach,' IEEE Personal Communications, Apr. 1998, pp. 32-38.

Kugler and Lechner, 'Combined Use of GPS and LORAN-C in Integrated Navigation Systems,' Fifth International Conference on Satellite Systems for Mobile Communications and Navigation, London, UK, May 13-15, 1996, pp. 199-207.

Kyriazakos et al., 'Optimization of the Handover Algorithm based on the Position of the Mobile Terminals,' Communications and Vehicular Technology, Oct. 2000, pp. 155-159.

Leonhardt and Magee, 'Multi-Sensor Location Tracking,' MOBICOM Oct. 1998, Dallas, TX, pp. 203-214.

Leonhardt and Magee, 'Towards a general location service for mobile environments,' Proc. Third International Workshop on Services in Distributed and Networked Environments, Jun. 3-4, 1996, 8 pages.

Lloyd et al., 'Cellular phone base stations installation violate the Electromagnetic Compatibility regulations', IEEE, Aug. 2004.

Long et al., 'Rapid Prototyping of Mobile Context-Aware Applications: The Cyberguide Case Study,' MobiCom '96, Nov. 1996, 11 pages.

Lusky et al., 'Mapping the Present,' ColoradoBiz, Nov. 1999, 26(11):16-17.

Mahmassani et al., 'Providing Advanced and Real-Time Travel/Traffic Information to Tourists,' Center for Transportation Research, Bureau of Engineering Research, The University of Texas at Austin, Oct. 1998, 15 pages.

Manabe et al., 'On the M-CubITS Pedestrian Navigation System', IEEE, Sep. 2006, pp. 793-798.

Mark, 'A Conceptual Model for Vehicle Navigation Systems,' First Vehicle Navigation and Information System Conference, Sep. 11-13, 1989, Toronto, Canada 11 pages.

Maxwell et al., 'Alfred: The Robot Waiter Who Remembers You,' AAAI Technical Report WS-99-15, Jun. 1999, 12 pages.

McCarthy and Meidel, 'ACTIVEMAP: A Visualization Tool for Location Awareness to Support Informal Interactions,' HUC '99, LNCS 1707, Sep. 1999, pp. 158-170.

Meier et al., 'Location-Aware Event-Base Middleware: A Paradigm for Collaborative Mobile Applications?', Sep. 2003.

Microsoft Outlook 2003 User's Guide, http://opan.admin.ufl.edu/user.sub.--guides/outlook2003.htm. Aug. 2004, 17 pages.

Miller et al., 'Integrating Hierarchical Navigation and Querying: A User Customizable Solution,' ACM Multimedia Workshop on Effective Abstractions in Multimedia Layout, Presentation, and Interaction, San Francisco, CA, Nov. 1995, 8 pages.

Miller et al., 'Synchronization of Mobile XML Databases by Utilizing Deferred Views', IEEE Nov. 2004.

Muraskin, 'Two-Minute Warnings for School Bus Riders,' Internet: URL:http://www.callcentermagazine.com/shared/printableArticle.jhtml;jsess- ionid=PQHISZXW . . . Jul. 1, 1999, 3 pages.

Nagao et al., Walk Navi: A Location-Aware Interactive Navigation/Guideline System and Software III, First edition, pp. 9-48, published by Kindai-Kagaku-Sya Co. Ltd., Dec. 10, 1995.

Nardi et al., 'Integrating Communication and Information through Contact Map', Communications of the ACM, vol. 45, No. 4, Apr. 2002.

Navizon Peer-to-Peer Wireless Positioning; [online] [Retrieved on Nov. 30, 2007]; Retrieved from the Internet, URL: http//www.navizon.com/; 2 pages.

Ni and Deakin, 'On-Board Advanced Traveler Information Systems,' Dec. 1, 2002, 10 pages.

Noonan and Shearer, 'Intelligent Transportation Systems Field Operational Test Cross-Cutting Study Advance Traveler Information systems,' Intelligent Transporation Systems Field Operational Test Cross-Cutting Study, Sep. 1998, 26 pages.

Northard, 'Docking Station Communication Link', IBM TDB, Feb. 1994.

O'Grady et al., 'A Tourist-Centric Mechanism for Interacting with the Environment,' Proceedings of the First International Workshop on Managing Interactions in Smart Environments (MANSE '99), Dublin, Ireland, Dec. 1999, pp. 56-67.

Oh et al., 'Spatial Applications Using 4S Technology for Mobile Environment', IEEE Jun. 2002.

Paksoy et al., 'The Global Position System-Navigation Tool of the Future', Journal of Electrical & Electronics, Jan. 2002, vol. 2, No. 1, pp. 467-476.

Parikh, 'Tele Locate', IBM Technical Disclosure Bulletin, [online] [Retrieved Nov. 7, 2008] Retrieved from the Internet, URL: https://www.delphion.com/tdbs/tdb?order=92A+62775; Sep. 1992; 1 page.

Pascoe et al., 'Developing Personal Technology for the Field,' Personal Technologies, Mar. 1998, 2:28-36.

Pfoser et al., 'Dynamic Travel Time Maps—Enabling Efficient Navigation', Proceedings of the 18th International Conference on Scientific and Statistical Database Management (SSDBM'06), IEEE, Jul. 2006, 10 pages.

Popescu-Zeletin et al., 'Applying Location-Aware Computing for Electronic Commerce: Mobile Guide,' Proc. 5th Conference on Computer Communications, AFRICOM-CCDC'98,Oct. 20-22, 1998, 14 pages.

Portfolio 2007; [online] [Retrieved on Jun. 14, 2007]; Retrieved from the Internet, URL: http://eric.wahlforss.com/folio; 3 pages.

(56) References Cited

OTHER PUBLICATIONS

Pungel, 'Traffic control-beat the jam electronically,' Funkschau, 1988, 18:43-45 (w/English translation).
Budka et al., 'A Bayesian method to Improve Mobile Geolocation Accuracy', IEEE, Sep. 2002, pp. 1021-1025.
Burnett, 'Usable Vehicle Navigation Systems: Are We There Yet?' Vehicle Electronic Systems 2000, Jun. 29-30, 2000, 3.1.1-3.1.12.
Camp et al., 'A computer-based method for predicting transit time parameters using grid systems', Decision Sciences, vol. 5, pp. 339-346, Jul. 1974.
Carew; 'Phones that tell you where to drive, meet, eat'; [online] [Retrieved May 26, 2007]; Retrieved from the Internet <URL htttp://news.yahoo.com/s/nm/20070525/wr_nm/column_pluggedin_dc_2&printer=1;_ylt=Ahqaftn7xmlS2rOFZFeu9G4ht.cA; 2 pages.
Challe, 'Carminat—An Integrated information and guidance system,' Vehicle Navigation and Information Systems Conference, Oct. 20-23, 1991, Renault—Direction de la Recherche, Rueil-Malmaison, France.
Charny, 'AT&T puts 411 to the text'; [online] [Retrieved Mar. 4, 2009]; Retrieved from the A410 Internet <URL http://news.cnet.com/ATT-puts-411-to-the-textf2100-1039_3-1000669.html; May 8, 2003; 2 pages.
Chen et al., 'The model of optimum route selection in vehicle automatic navigation system based on unblocked reliability analyses', IEEE Oct. 2003.
Cheverst et al., 'Architectural Ideas for the Support of Adaptive Context-Aware Applications,' Proceedings of Workshop on Infrastructure for Smart Devices—How to Make Ubiquity an Actuality, HUC'00, Bristol, Sep. 2000, 3 pages.
Cheverst et al., 'Design of an Object Model for a Context Sensitive Tourist Guide,' Computers and Graphics, Nov. 1999, 23(6):883-891.
Cheverst et al., 'Developing Interfaces for Collaborative Mobile Systems,' May 1998, 15 pages.
Cheverst et al., 'Experiences of Developing and Deploying a Context-Aware Tourist Guide: The GUIDE Project,' Aug. 2000, pp. 20-31.
Cheverst et al., 'Exploiting Context to Support Social Awareness and Social Navigation,' SIGGROUP Bulleting Dec. 2000, 21(3):43-48.
Cheverst et al., 'Services to Support Consistency in Mobile Collaborative Applications,' Proc. 3rd International Workshop on Services in Distributed Networked Environments, Jun. 1996, 8 pages.
Cheverst et al., 'Sharing (Location) Context to Facilitate Collaboration Between City Visitors,' Nov. 2000, 8 pages.
Cheverst et al., 'Supporting Collaboration in Mobile-aware Groupware,' Workshop on Handheld CSCW, May 1998, 6 pages.
Cheverst et al., 'The Role of Connectivity in Supporting Context-Sensitive Applications,' HUC'99, LNCS 1707, Sep. 1999, pp. 193-209.
Cheverst et al., 'The Support of Mobile-Awareness in Collaborative Groupware,' Personal Technologies, Mar. 1999, 3:33-42.
Cho et al., A Traveler Information Service Structure in Hybrid T-DMB and Cellular Communication Network, Broadcast Systems Research Group, IEEE, May 2006, pp. 747-750.
Christie et al., 'Development and Deployment of GPS wireless devices for E911 and Location based services', IEEE Apr. 2002.
Chua et al., 'Intelligent Portal for Event-triggered SMS Alerts', 2nd International Conference on Mobile Technology, Applications and Systems, Nov. 2005.
Civilis et al., 'Efficient Tracking of Moving Objects with Precision Guarantees', IEEE, Proceedings of the First Annual International Conference on Mobile and Ubiquitous Systems: Networking and Services, Aug. 2004, 10 pages.
Clarke et al., 'Development of Human Factors Guidelines for Advanced Traveler Information Systems (ATIS) and Commercial Vehicle Operations (CVO): Comparable Systems Analysis,' U.S. Department of Transportation Federal Highway Administration, Publication No. FHWA-RD-95-197, Dec. 1996, 212 pages.

Costa et al., 'Experiments with Reflective Middleware,' Proceedings of the ECOOP'98 Workshop on Reflective Object-Oriented Programming and Systems, ECOOP'98 Workshop Reader, Jul. 1998, 13 pages.
Dalrymple, Jim; 'Google Maps adds locator, but not for iPhone', [online] [Retrieved Nov. 30, 2007]; Retrieved from the Internet <URL: http://news.yahoo.eom/s/macworld/20071130/tc macworld/googlemaps20071130 0&printer=1;_ylt=Auvf3s6LQK_pOaJ1b954T_DQn6gB; 1 page.
Davies et al., "Caches in the Air': Disseminating Tourist Information in the Guide System,' Second IEEE Workshop on Mobile Computer Systems and Applications, Feb. 25-26, 1999, 9 pages.
Davies et al., 'L2imbo: A distributed systems platform for mobile computing,' Mobile Networks and Applications, Aug. 1998, 3:143-156.
Dey et al., 'CyberDesk: A framework for providing self-integrating context-aware services,' Knowledge-Based Systems, 1998, 11:3-13.
Dey, 'Context-Aware Computing: The CyberDesk Project,' [online] Retrieved from the Internet: URL: http://www.cc.gatech.edu/fce/cyberdesk/pubs/AAAI98/AAAI98.html; AAAI '98 Spring Symposium, Stanford University, Mar. 23-25, 1998, downloaded from the Internet on Aug. 6, 2010,8 pages.
Dibdin, Peter, 'Where are mobile location based services?', Dec. 14, 2001, pp. 1-8.
Digital cellular telecommunications system (Phase 2+); Location Services (LCS); Service description, Stage 1 (GSM 02.71) ETSI, Apr. 1999, 22 pages.
Dix et al., 'Exploiting Space and Location as a Design Framework for Interactive Mobile Systems,' ACM Transactions on Computer-Human Interaction (TOCHI)—Special issue on human-computer interaction with mobile systems, Sep. 2000, 7(3):285-321.
Dommety, et al., Potential Networking Applications of Global Positioning Systems (GPS) [online] [retrieved on Nov. 18, 2008] [retrieved from http://arxiv.org/ftp/cs/papers/9809/9809079.pdf] OSU Technical Report TR-24, Apr. 1996, pp. 1-40.
Drane and Rizos, 'Role of Positioning Systems in ITS,' Positioning Systems in Intelligent Transportation Systems, Dec. 1997, pp. 312, 346-349.
Drane et al., 'Positioning GSM Telephones,' IEEE Communications Magazine, Apr. 1998, pp. 46-59.
Drane et al., 'The accurate location of mobile telephones', Third Annual World Congress on Intelligent Transport Systems, Orlando, Florida, Oct. 1996.
Dunn et al., 'Wireless Emergency Call System', IBM TDB, Sep. 1994.
Ebine, 'Dual Frequency resonant base station antennas for PDC systems in Japan', IEEE, pp. 564-567, Jul. 1999.
Efstratiou and Cheverst, 'Reflection: A Solution for Highly Adaptive Mobile Systems,' Apr. 2000 Workshop on Reflective Middleware, 2000, 2 pages.
Efstratiou et al., 'Architectural Requirements for the Effective Support of Adaptive Mobile Applications,' 2000, 12 pages.
Evans, 'In-Vehicle Man-Machine Interaction the Socrates Approach', Vehicle Navigation & Information System Conference Proceedings, 1994, Aug. 31-Sep. 2, 1994, pp. 473-477.
Feddema et al., 'Cooperative Sentry Vehicles and Differential GPS Leapfrog,' Oct. 2000, United States Department of Energy, pp. 1-12.
Fischer et al., 'System Performance Evaluation of Mobile Positioning Methods,' IEEE, Aug. 2002, pp. 1962-1966.
Flinn and Satyanarayanan, 'PowerScope: A Tool for Profiling the Energy Usage of Mobile Applications,' Proc. WMCSA 99 Second IEEE Workshop on Mobile Computing Systems and Applications, Feb. 25-26, 1999,9 pages.
FM 3-25.26 Map Reading and Land Navigation Field Manual No. 3-25.26, Headquarters Department of the Army, Washington, DC [online] [retrieved on Apr. 9, 2004] [retrieved from http://155.217.58.58/cgi-bin/atdl.dll/fm/3-25.26/toc.htm] Jul. 20, 2001, pp. 1-7 and J-1 to J-3.
French and Driscoll, 'Location Technologies for ITS Emergency Notification and E911,' Proc. 1996 National Technical Meeting of the Institute of Navigation, Jan. 22-24, 1996, pp. 355-359.

(56) References Cited

OTHER PUBLICATIONS

Freundschuh, 'Does 'Anybody' Really Want {Or Need) Vehicle Navigation Aids?' First Vehicle Navigation and Information System Conference, Sep. 11-13, 1989, Toronto, Canada, 5 pages.
Friday et al., 'Developing Adaptive Applications: The MOST Experience,' J. Integrated Computer-Aided Engineering, Apr. 1999, pp. 143-157.
Gould, 'The Provision of Usable Navigation Assistance: Considering Individual Cognitive Ability,' First Vehicle Navigation and Information System Conference, Sep. 11-13, 1989, Toronto, Canada, 7 pages.
GPS 12 Personal Navigator Owner's Manual & Reference, Garmin Corporation, Jan. 1999, pp. 1-60.
Green et al., 'Suggested Human Factors Design Guidelines for Driver Information Systems,' Technical Report UMTRI-93-21, Nov. 1993, 119 pages.
27 Countries in your pocket; [online] [Retrieved on Sep. 29, 2005] Retrieved from the Internet <URL: http://www.mio-tech.be/en/printview/press-releases-2005-09-29.htm;1 page.
3rd Generation Partnership Project (3GPP); Technical Specification Group (TSG) RAN; Working Group 2 (WG2); Report on Location Services (LCS), 3G TR 25.923 v1.0.0, Apr. 1999, 45 pages.
3rd Generation Partnership Project (3GPP); Technical Specification Group (TSG) RAN; Working Group 2 (WG2); Report on Location Services, TS RAN R2.03 V0.1.0, Apr. 1999, 43 pages.
Animated Transition; [online] [Retrieved on Oct. 16, 2006] Retrieved from the Internet <URL: http://designinterfaces.com/AnimatedTransition; 2 pages.
Cyberguide: a mobile context-aware tour guide, Wireless Networks Archive (Special Issue: Mobile computing and networking; selecting papers from MobiCom '96), 3(5):421-433, Oct. 1997.
DaimlerCrysler Guide5 Usecases Overview Map, 1 page (no reference date).
DialDTMF, [online] [Retrieved Jan. 10, 2008]; Retrieved from the Internet URL: http://dialdtmf.sourceforge.net/; 9 pages.
Enabling UMTS / Third Generation Services and Applications, No. 11 Report from the UMTS Forum, Oct. 2000, 72 pages.
Error: could not find a contact with this e-mail address. Outlookbanter.com. Dec. 2006, 12 pages.
Estonian operator to launch world's first Network-based location services, Ericsson Press Release, Oct. 11, 1999, 2 pages.
FAQ; [online] [Retrieved Nov. 30, 2007] Retrieved from the Internet, URL: http://www.navizon.com/FAQ.htm; 8 pages.
Frontiers in electronic media, Interactions Archive 4(4):32-64, Jul. 1997.
How it Works; Navizon—Peer-to-Peer Wireless Positioning; [online] [Retrieved on Nov. 30, 2007]; Retrieved from the Internet, URL: http://www.navizon.com/FullFeatures.htm, 7 pages.
International Roaming Guide-Personal Experience(s) from Customer and Community Member; [online] [Retrieved Jun. 26, 2006] Retrieved from the Internet <URL: http://forums.cingular.com/cng/board/message?board.id=1185; 6 pages.
IPhone Software/Hardware Hack: LocoGPS-GPS Add-on for the iPhone; [online] [Retrieved on Dec. 25, 2007] Retrieved from the Internet <URL: http://www.iphonehacks.com/iphone-applications/index.html; 41 pages.
LaBarge in joint venture on bus system, Internet: URL:http://www.bizjournals.com/stlouis/stories/1998/08/10/focus2.html?t-p- rintable, Aug. 7, 1998, 1 page.
Location-aware mobile applications based on directory services, International Conference on Mobile Computing and Networking Archive, Proceedings on the 3rd Annual ACM/IEEE International Conference on Mobile Computing and Networking, Budapest, Hungary, pp. 23-33, Sep. 1997.
Mio 269+ Users Manual; Aug. 2005; 44 pages.
MOREnet Dialing Plan: PSTN and IP Network Integration for H.323, H320 VoIP and Public Voice Networks, [online] [Retrieved on Jan. 11, 2008] Retrieved from the Internet < URL: http://www.more.net/technical/research/dialplan/index.html, 12 pages.

New Handsets Strut Their Stuff At Wireless '99, Internet: URL: http://findarticles.com/p/articles/mi_mOBMD/is_1999Feb_11/ai_n27547656/downloaded from Internet on Feb. 11, 1999, 3 pages.
New program for mobile blogging for PocketPC released: MY BLOG; [online] [Retrieved on Apr. 5, 2006]; Retrieved from the Internet, URL: http://msmobiles.com/news.php/4067.html.
Numbering and Dialing Plan within the United States, Alliance for Telecommunications Industry Solutions; Aug. 2005; 17 pages.
Nuvifone Images.; [online] [Retrieved on Feb. 4, 2008]; Retrieved from the Internet, URL: http://www8.garmin.com/buzz/nuvifone/media-gallery.jsp; 2 pages.
Revised CR to Sep. 31 on work item LCS, ETSI SMG3 Plenary Meeting #6, Nice, France, Dec. 13-15, 1999. 18 pages.
School Buses to Carry Noticom's First Application, Internet: URL: http://findarticles.com/p/articles/mi_mOBMD/is_1999_Feb_17/ai_n27547754/ downloaded from the Internet on Feb. 17, 1999, 2 pages.
Sprite Terminator User Guide, [online] Dec. 6, 2007 (Dec. 6, 2007), pp. 1-45, Retrieved from the Internet: URL: http://www.spritesoftware.com/getmedia/4d21ad24-fd62-4c5e-a4fe-15ebc99aac9a/SpriteTerminator.aspx> [retrieved on Jul. 9, 2010].
Travel Time Data Collection Handbook—Chapter 5: ITS Probe Vehicle Techniques, FHWA-PL-98-035 Report, Department of Transport, University of Texas, Mar. 1998; [online] [Retrieved from the Internet at http://www.fhwa.dot.gov/ohim/handbook/chap5.pdf.
User-centered design of mobile solutions, NAMAHN, 2006, 18 pages.
User's Manual MioMap 2.0; Aug. 2005; 60 pages.
Windows Live Search for Mobile Goes Final, Still Great; [online] [Retrieved on Mar. 11, 2007]; Retrieved from the Internet, URL: http://gizmodo.com/gadgets/software/windows-live-search-for-mobile-goes-f- inal-still-great-236002.php; 3 pages.
Windows Mobile 6 Professional Video Tour; [online] [Retrieved on Mar. 11, 2007]; Retrieved from the Internet, URL: http://gizmodo.com/gadgets/cellphones/windows-mobile-6-professional-video-tour-237039.php; 4 pages.
Windows Mobile; Microsoft; Feb. 2007, 2 pages.
3rd Generation Partnership Project; Technical Specification Group Services and System Aspects; Functional stage 2 description oflocation services in UMTS, 3G TS 23.171 v.1.1.0, Nov. 1999, 42 pages.
Abowd et al., 'Context-awareness in wearable and ubiquitous computing,' 1st International Symposium on Wearable Computers, Oct. 13-14, 1997, Cambridge, MA, 9 pages.
Akerblom, 'Tracking Mobile Phones in Urban Areas,' Goteborg University Thesis, Sep. 2000, 67 pages.
Anand et al., 'Quantitative Analysis of Power Consumption for Location-Aware Applications on Smart Phones', IEEE International Symposium on Industrial Electronics, Jun. 2007.
Akyatsuka et al., 'UbiquitousLinks. Hypermedia Links Embedded in the Real World, Technical Report of Information Processing Society, 96-HI-67,' Information Processing Society of Japan, Jul. 11, 1996, 96(62):23-30.
Balliet, 'Transportation Information Distribution System', IBM Technical Disclosure Bulletin, [online] [Retrieved Nov. 7, 2008] Retrieved from the Internet, URL: https://www.delphion.com/tdbs/tdb?order=86A+61395; Jun. 1986; 2 pages.
Balsiger et al., 'MOGID: Mobile Geo-depended Information on Demand,' Workshop on Position Dependent Information Services (W3C-WAP), Feb. 2000, 8 pages.
Beard et al., 'Estimating Positions and Paths of Moving Objects', IEEE Jul. 2000, pp. 1-8.
Bederson, B.B., Audio Augmented Reality: A Prototype Automated Tour Guide [online] [retrieved on Aug. 30, 2002] [retrieved from http://www.cs.umd.edu/~bederson/papers/chi-95-aar/] pp. 1-4.
Benefon ESC! GSM+GPS Personal Navigation Phone, benefon.com, Copyright 2001, 4 pages.
Berman et al., 'The Role of Dead Reckoning and Inertial Sensors in Future General Aviation Navigation', IEEE, Apr. 1998, pp. 510-517.
Bevly et al., 'Cascaded Kalman Filters for Accurate Estimation of Multiple Biases, Dead-Reckoning Navigation, and Full State Feedback Control of Ground Vehicles', IEEE Transactions on Control Systems in Technology, vol. 15, No. 2, Mar. 2007, pp. 199-208.

(56) References Cited

OTHER PUBLICATIONS

Bokharouss et al., 'A Location-Aware Mobile Call Handling Assistant', International Conference on Advanced Information Networking and Applications Workshops, May 2007.
Bonsignore, 'A Comparative Evaluation of the Benefits of Advanced Traveler Information System (ATIS) Operational Tests,' MIT Masters Thesis, Feb. 1994, 140 pps.
Boonsrimuang et al., 'Mobile Internet Navigation System', IEEE, Jul. 2002, pp. 325-328.
Borsodi, 'Super Resolution of Discrete Arrivals in a Cellular Geolocation System,' University of Calgary Thesis, Apr. 2000, 164 pages.
Brown, 'The stick-e document: a framework for creating context-aware applications,' Electronic Publishing, Jun. 1995, 8:259-272.
Brown, 'Triggering Information by Context,' Personal Technologies, Mar. 1998, 2:18-27.
RD 409052, Research Disclosure Alerting Abstract, 'Location dependent information for satellite based vehicle communication—required application of Global Position System (GPS) to automatically extract relevant portions of data package as vehicle changes position,' May 10, 1998, 1 page.
Rekimoto, J., Augment-able Reality: Situated Communication through Physical and Digital Spaces, iswc, pp. 68, Second International Symposium on Wearable computers (ISWC'98), Oct. 1998, pp. 1-8.
Review Guide—Google Maps for mobile (beta); Google; Apr. 2006; 7 pages.
Rillings and Betsold, 'Advanced driver information systems,' Vehicular Technology, IEEE Vehicular Technology Society, Feb. 1991, 40:31-40.
Rogers et al., 'Adaptive User Interfaces for Automotive Environments', IEEE Intelligent Vehicles Symposium 2000, Oct. 3-5, 2000, pp. 662-667.
Rozier, J., Hear & There: An Augmented Reality System of Linked Audio, Proceedings of the International Conference on Auditory Display, Atlanta, GA, Apr. 2000, pp. 1-6.
Samadani et al., 'PathMarker: Systems for Capturing Trips', IEEE (2004) International Conference on Multimedia and Expo., Publication Date: Jun. 27-30, 2004, vol. 3, pp. 2123-2126, 2004.
Schreiner, 'Where We At? Mobile Phones Bring GPS to the Masses', IEEE Computers Society, May/Jun. 2007, pp. 6-11.
Serafin et al., 'Functions and Features of Future Driver Information Systems,' Technical Report UMTRI-91-16, May 1991,104 pages.
Shekhar and Liu, 'Genesis and Advanced Traveler Information Systems {ATIS): Killer Applications for Mobile Computing?' NSF Mobidata Workshop on Mobile and Wireless Information Systems, Nov. 1994, 20 pages.
Shibata et al., 'Development and Integration of Generic Components for a Teachable Vision-Based Mobile Robot,' IEEE/ASME Transactions on Mechatronics, Sep. 1996, 1(3):230-236.
Spohrer. 'New Paradigms for Using Computers', 1997; retrieved from the Internet Feb. 13, 1998, URL: <http://almaden.ibm.com/npuc97/1997/spohrer.htm>.
Sung et al., 'Towards Reliable Peer-to-Peer Data Sharing over Mobile Ad hoc Networks', IEEE, May 2005.
Tarumi et al., 'Public Applications of SpaceTag and Their Impacts,' Digital Cities, LNCS 1765, Sep. 1999, pp. 350-363.
Tebbutt, 'Dial your way out of the woods,' The Australian, Feb. 2000, 1 page.
Tijerina et al., 'Driver Workload Assessment of Route Guidance System Destination Entry While Driving: A Test Track Study,' Proceedings of the 5th ITS World Congress, Oct. 12-16, 1998, Seoul, Korea, 9 pages.
Tso et al., 'Always On, Always Connected Mobile Computing,' Mobile Communications Operation—Mobile Handheld Products Group, Sep. 1996, pp. 918-924.
Tsuzawa and Okamoto, 'Advanced Mobile Traffic Information and Communication System,' First Vehicle Navigation and Information Systems Conference, Sep. 11-13, 1989, Toronto, Canada, Abstract only.
Wang and Lin, 'Location Aware Information Agent over WAP,' Tamkang Journal of Science and Engineering, Jan. 2000, 3(2):107-115.
Wang et al., 'An Unified Vehicle Supervising and Traffic Information System', IEEE, Oct. 1996, pp. 968-972.
Weiss et al., 'Zone services—An approach for location-based data collection', Proceedings of the 8th International Conference on E-commerce Technology and the 3rd IEEE International Conference on Enterprise Computing, E-Commerce and E-Services (8 pages), Jun. 2006.
Wheeler et al., 'Development of Human Factors Guidelines for Advanced Traveler Information Systems and Commercial Vehicle Operations: Task Analysis of ATIS/CVO Functions,' US Dept. Transportation Federal Highway Administration Research and Development, Publication No. FHWA-RD-95-176, Nov. 1996, 124 pps.
Wong, 'GPS: making roads safer and solving traffic tangles,' Asia Engineer, Oct. 1995, 23(9):31-32.
Wu et al., 'A Mutlimedia System for Route Sharing and Video-based Navigation', IEEE, Jul. 2006, pp. 73-76.
Wu et al., 'Mobile Phone GIS Based on Mobile SVG', IEEE Jul. 2005.
Yamamoto et al., 'Position Location Technologies Using Signal Strength in Cellular Systems', IEEE, May 2001, pp. 2570-2575.
Yang et al. 'Global Snapshots for Distributed Debugging', IEEE, pp. 436-440, May 1992.
Ygnace et al., 'Travel Time Estimation on the San Francisco Bay Area Network Using Cellular Phones as Probes', Working Paper, Institute of Transportation Studies, University of California, Berkeley, Jan. 2000.
Yim et al., 'Travinfo Field Operational Test: Work Plan for the Target, Network, and Value Added Reseller (VAR) Customer Studies,' Working Papers, California Partners for Advanced Transit and Highways (PATH), Institute of Transportation Studies, UC Berkeley, Apr. 1, 1997, 49 pages.
Yogesh C. Rathod, Third Party Submission in U.S. Appl. No. 12/233,358 mailed Mar. 30, 2010, 12 pages.
Yokote, 'The Apertos Reflective Operating System: The Concept and Its Implementation,' OOPSLA'92, Oct. 1992, pp. 414-434.
Zhao, 'Mobile Phone Location Determination and Its Impact on Intelligent Transportation Systems,' IEEE Transactions on Intelligent Transportation Systems, Mar. 2000, 1(1):55-64.
Zubac and Strahonja, 'Theory and Development of an Online Navigation System,' 18th International Conference on Information and Intelligent Systems, University of Zagreb, Sep. 12-14, 2007.

LOCATION SHARING

CROSS REFERENCE TO RELATED APPLICATIONS

This Application is a continuation of U.S. patent application Ser. No. 13/745,023 entitled "Location Sharing" filed Jan. 18, 2013, which is a divisional of U.S. patent application Ser. No. 12/165,413 entitled "Location Sharing" filed Jun. 30, 2008, both of which are incorporated by reference herein in their entireties.

BACKGROUND

This subject matter is generally related to data communications between electronic devices.

Conventional mobile devices are often dedicated to performing a specific application. For example, a mobile phone provides telephony services, a personal digital assistant (PDA) provides a way to organize addresses, contacts, and notes, a media player plays content, email devices provide email communication, a browser allows a user to surf the Internet, etc. Modern mobile devices can include two or more of these applications.

Some mobile devices (e.g., the iPhone®) include a short message service (SMS) for sending instant messages to one or more receiving devices. Some mobile devices also provide a map service which can use positioning technology to determine a user's geographic location and display an icon on a map display to show the user's current location. The map service may also allow the user to obtain directions to a desired destination and display a route to the destination on the map display.

SUMMARY

A geographic location of a first device is determined. Input is obtained specifying sharing of the geographic location with a second device. Geographic location data is sent from a first device to a second device with a modified message to signal the presence of geographic location data associated with the message. The message can include (or attach) the geographic location data or file, or the message can include a link to a network-based resource which the second device can use to obtain the geographic location data. In some implementations, when a user of the first device views a location on a map display of the first device, a graphical user interface is presented to allow the user to select an option to share the geographic location with the second device. The second device receives geographic location data or a link from the first device which can trigger a map display on the second device showing the location of the first device and, optionally, the location of the second device. A route from the first device to the second device can be generated and displayed on the map display of the first or second device.

Other implementations are disclosed which are directed to systems, methods and computer-readable mediums. For example, in some implementations contact information can be encoded in a text message and sent to a device where it can be displayed and added to an address book application.

DETAILED DESCRIPTION

Example Mobile Device

Figure 1:
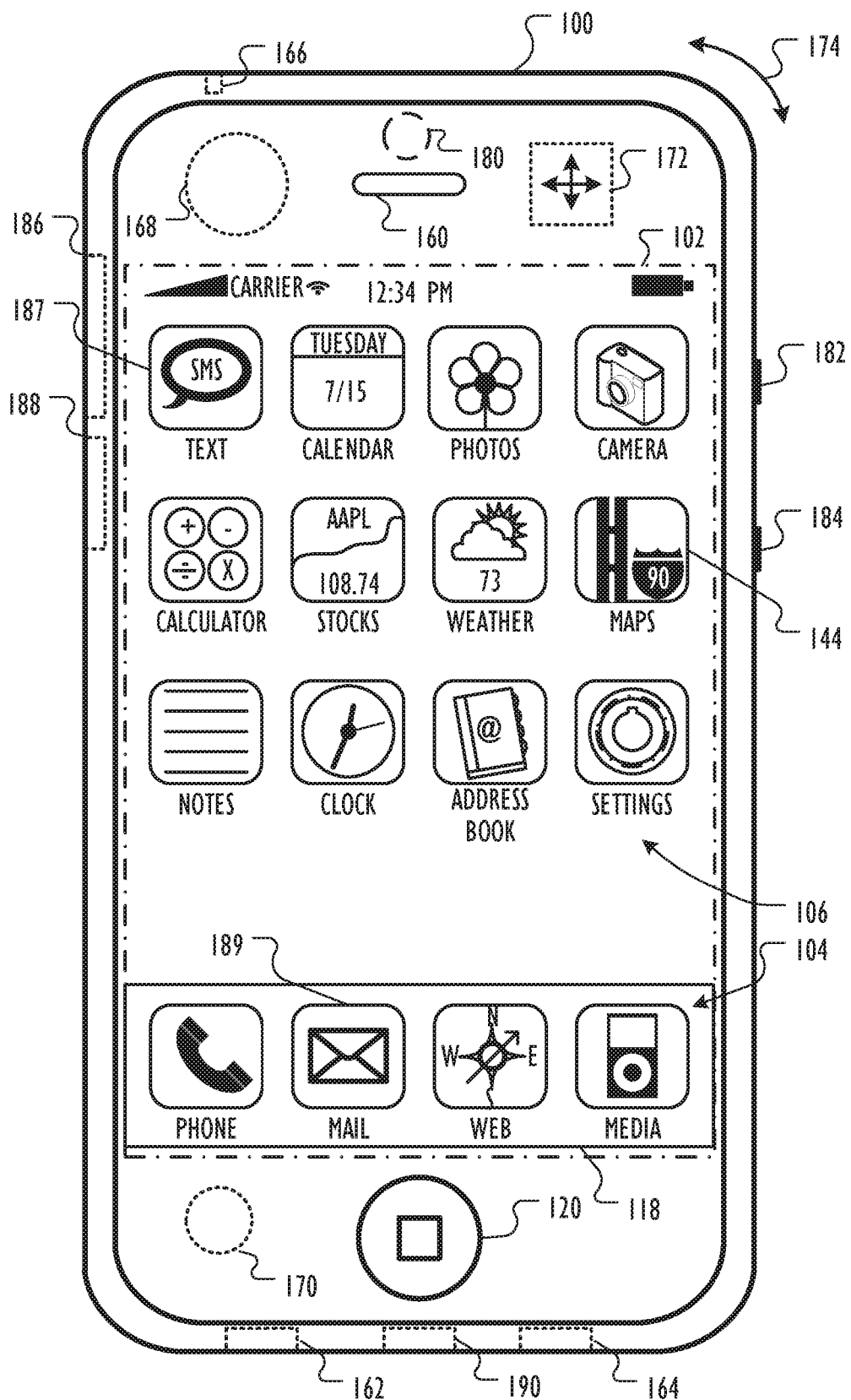
FIG. 1 illustrates an example mobile device.

FIG. 1 is a block diagram of an example mobile device 100. The mobile device 100 can be, for example, a handheld computer, a personal digital assistant, a cellular telephone, a network appliance, a camera, a smart phone, an enhanced general packet radio service (EGPRS) mobile phone, a network base station, a media player, a navigation device, an email device, a game console, or a combination of any two or more of these data processing devices or other data processing devices.

Mobile Device Overview

In some implementations, the mobile device 100 includes a touch-sensitive display 102. The touch-sensitive display 102 can implement liquid crystal display (LCD) technology, light emitting polymer display (LPD) technology, or some other display technology. The touch sensitive display 102 can be sensitive to haptic and/or tactile contact with a user.

In some implementations, the touch-sensitive display 102 can comprise a multi-touch-sensitive display 102. A multi-touch-sensitive display 102 can, for example, process multiple simultaneous touch points, including processing data related to the pressure, degree, and/or position of each touch point. Such processing facilitates gestures and interactions with multiple fingers, chording, and other interactions. Other touch-sensitive display technologies can also be used, e.g., a display in which contact is made using a stylus or other pointing device. Some examples of multi-touch-sensitive display technology are described in U.S. Pat. Nos. 6,323,846, 6,570,557, 6,677,932, and 6,888,536, each of which is incorporated by reference herein in its entirety.

In some implementations, the mobile device 100 can display one or more graphical user interfaces on the touch-sensitive display 102 for providing the user access to various system objects and for conveying information to the user. In some implementations, the graphical user interface can include one or more display objects 104, 106. In the example shown, the display objects 104, 106, are graphic representations of system objects. Some examples of system objects include device functions, applications, windows, files, alerts, events, or other identifiable system objects.

Example Mobile Device Functionality

In some implementations, the mobile device 100 can implement multiple device functionalities, such as a telephony device, an e-mail device, a network data communication device, a Wi-Fi base station device (not shown), and a media processing device. In some implementations, particular display objects 104 can be displayed in a menu bar 118. In some implementations, device functionalities can be accessed from a top-level graphical user interface, such as the graphical user interface illustrated in FIG. 1. Touching one of the display objects 104 can, for example, invoke corresponding functionality. For example, touching the display object 189 would invoke an email application on the mobile device 100 for sending text and geographic location data files, as described in reference to FIG. 6.

In some implementations, the mobile device 100 can implement network distribution functionality. For example, the functionality can enable the user to take the mobile device 100 and provide access to its associated network while traveling. In particular, the mobile device 100 can extend Internet access (e.g., Wi-Fi) to other wireless devices in the vicinity. For example, mobile device 100 can be configured as a base station for one or more devices. As such, mobile device 100 can grant or deny network access to other wireless devices.

In some implementations, upon invocation of device functionality, the graphical user interface of the mobile device 100 changes, or is augmented or replaced with another user interface or user interface elements, to facilitate user access to particular functions associated with the corresponding device functionality. For example, in response to a user touching a phone object, the graphical user interface of the touch-sensitive display 102 may present display objects related to various phone functions; likewise, touching of an email object may cause the graphical user interface to present display objects related to various e-mail functions; touching a Web object may cause the graphical user interface to present display objects related to various Web-surfing functions; and touching a media player object may cause the graphical user interface to present display objects related to various media processing functions.

In some implementations, the top-level graphical user interface environment or state of FIG. 1 can be restored by pressing a button 120 located near the bottom of the mobile device 100. In some implementations, each corresponding device functionality may have corresponding "home" display objects displayed on the touch-sensitive display 102, and the top-level graphical user interface environment of FIG. 1 can be restored by pressing the "home" display object.

In some implementations, the top-level graphical user interface can include additional display objects 106, such as a short messaging service (SMS) object 187, a calendar object, a photos object, a camera object, a calculator object, a stocks object, a weather object, a maps object 144, a notes object, a clock object, an address book object, and a settings object. Touching the maps object 144 can, for example, invoke a mapping and location-based services environment and supporting functionality; likewise, a selection of any of the display objects 106 can invoke a corresponding object environment and functionality.

Additional and/or different display objects can also be displayed in the graphical user interface of FIG. 1. For example, if the device 100 is functioning as a base station for other devices, one or more "connection" objects may appear in the graphical user interface to indicate the connection. In some implementations, the display objects 106 can be configured by a user, e.g., a user may specify which display objects 106 are displayed, and/or may download additional applications or other software that provides other functionalities and corresponding display objects.

In some implementations, the mobile device 100 can include one or more input/output (I/O) devices and/or sensor devices. For example, a speaker 160 and a microphone 162 can be included to facilitate voice-enabled functionalities, such as phone and voice mail functions. In some implementations, an up/down button 184 for volume control of the speaker 160 and the microphone 162 can be included. The mobile device 100 can also include an on/off button 182 for a ring indicator of incoming phone calls. In some implementations, a loud speaker 164 can be included to facilitate hands-free voice functionalities, such as speaker phone functions. An audio jack 166 can also be included for use of headphones and/or a microphone.

In some implementations, a proximity sensor 168 can be included to facilitate the detection of the user positioning the mobile device 100 proximate to the user's ear and, in response, to disengage the touch-sensitive display 102 to prevent accidental function invocations. In some implementations, the touch-sensitive display 102 can be turned off to conserve additional power when the mobile device 100 is proximate to the user's ear.

Other sensors can also be used. For example, in some implementations, an ambient light sensor 170 can be utilized to facilitate adjusting the brightness of the touch-sensitive display 102. In some implementations, an accelerometer 172 can be utilized to detect movement of the mobile device 100, as indicated by the directional arrow 174. Accordingly, display objects and/or media can be presented according to a detected orientation, e.g., portrait or landscape. In some implementations, the mobile device 100 may include circuitry and sensors for supporting a location determining capability, such as that provided by the Global Positioning System (GPS) or other positioning systems (e.g., systems using Wi-Fi access points, television signals, cellular grids, Uniform Resource Locators (URLs)). In some implementations, a positioning system (e.g., a GPS receiver) can be integrated into the mobile device 100 or provided as a separate device that can be coupled to the mobile device 100 through an interface (e.g., port device 190) to provide access to location-based services.

In some implementations, a port device 190, e.g., a Universal Serial Bus (USB) port, or a docking port, or some other wired port connection, can be included. The port device 190 can, for example, be utilized to establish a wired connection to other computing devices, such as other communication devices 100, network access devices, a personal computer, a printer, a display screen, or other processing devices capable of receiving and/or transmitting data. In some implementations, the port device 190 allows the mobile device 100 to synchronize with a host device using one or more protocols, such as, for example, the TCP/IP, HTTP, UDP, and any other known protocol.

The mobile device 100 can also include a camera lens and sensor 180. In some implementations, the camera lens and sensor 180 can be located on the back surface of the mobile device 100. The camera can capture still images and/or video.

The mobile device 100 can also include one or more wireless communication subsystems, such as an 802.11b/g communication device 186, and/or a Bluetooth™ communication device 188. Other communication protocols can also be supported, including other 802.x communication protocols (e.g., WiMax, Wi-Fi, 3G), code division multiple access (CDMA), global system for mobile communications (GSM), Enhanced Data GSM Environment (EDGE), etc.

Network Operating Environment

Figure 2:
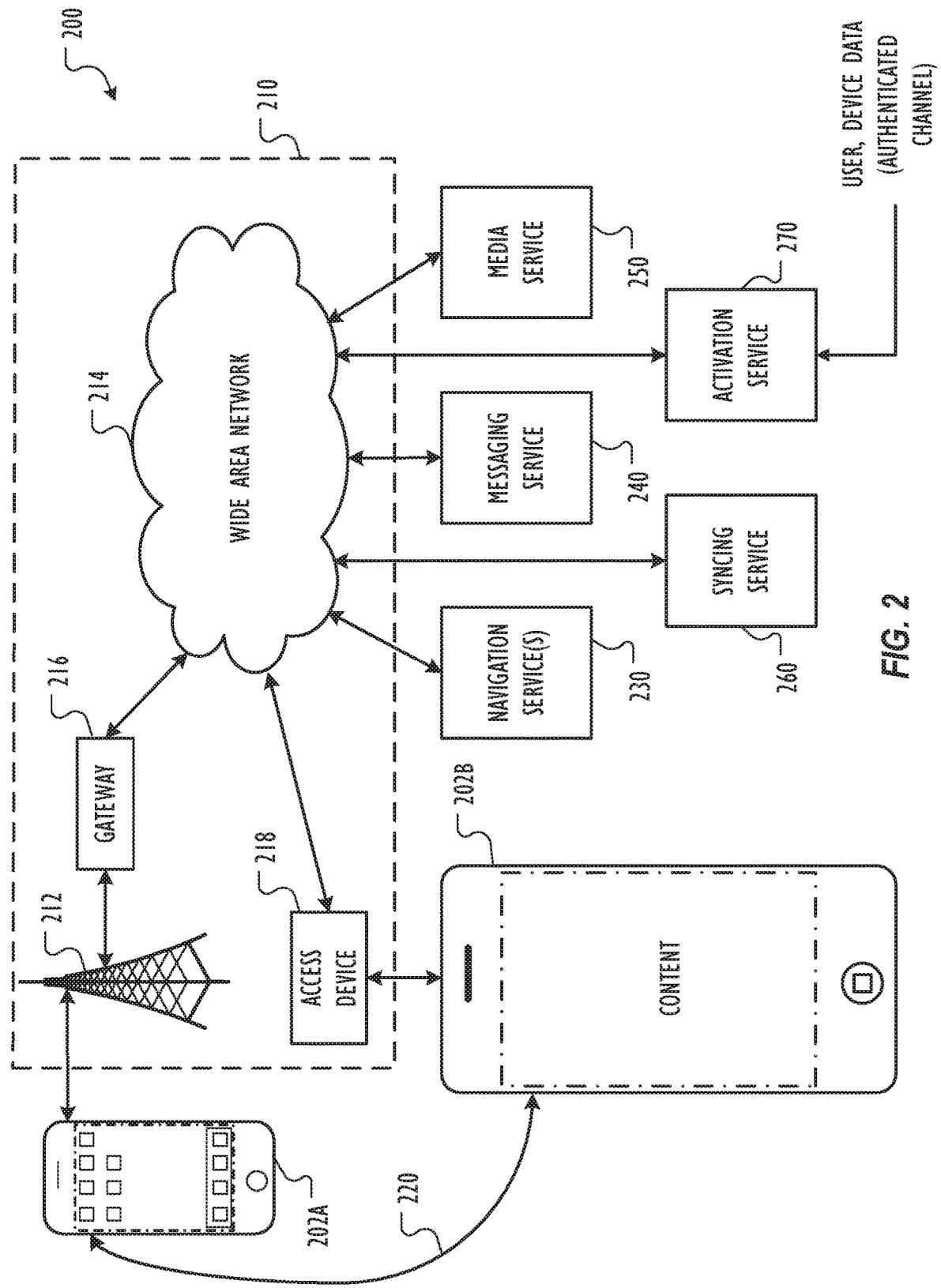
FIG. 2 is a block diagram of an example network operating environment for the mobile device of FIG. 1.

FIG. 2 is a block diagram of an example network operating environment for the mobile device of FIG. 1. Mobile devices 202a and 202b can, for example, communicate over one or more wired and/or wireless networks 210 in data communication. For example, a wireless network 212, e.g., a cellular network, can communicate with a wide area network (WAN) 214, such as the Internet, by use of a gateway 216. Likewise, an access device 218, such as an 802.11g wireless access device, can provide communication access to the wide area network 214. In some implementations, both voice and data communications can be established over the wireless network 212 and the access device 218. For example, the mobile device 202a can place and receive phone calls (e.g., using VoIP protocols), send and receive e-mail messages (e.g., using POP3 protocol), and retrieve electronic documents and/or streams, such as web pages, photographs, and videos, over the wireless network 212, gateway 216, and wide area network 214 (e.g., using TCP/IP or UDP protocols). Likewise, in some implementations, the mobile device 202b can place and receive phone calls, send and receive e-mail messages, and retrieve electronic documents over the access device 218 and the wide area network 214. In some implementations, the mobile device 202a or 202b can be physically connected to the access device 218 using one or more cables and the access device 218 can be a personal computer. In this configuration, the mobile device 202a or 202b can be referred to as a "tethered" device.

The mobile devices 202a and 202b can also establish communications by other means. For example, the wireless device 202a can communicate with other wireless devices, e.g., other mobile devices 202a or 202b, cell phones, etc., over the wireless network 212. Likewise, the mobile devices 202a and 202b can establish peer-to-peer communications 220, e.g., a personal area network, by use of one or more communication subsystems, such as the Bluetooth™ communication devices 188 shown in FIG. 1. Other communication protocols and topologies can also be implemented.

The mobile device 202a or 202b can, for example, communicate with one or more services 230, 240, 250, 260, and 270 over the one or more wired and/or wireless networks 210. For example, one or more navigation services 230 can provide navigation information, e.g., map information, location information, route information, and other information, to the mobile device 202a or 202b. A user of the mobile device 202b can invoke a map functionality, e.g., by pressing the maps object 144 on the top-level graphical user interface shown in FIG. 1, and can request and receive a map for a particular location, request and receive route directions, or request and receive listings of businesses in the vicinity of a particular location, for example.

A messaging service 240 can, for example, provide e-mail and/or other messaging services. A media service 250 can, for example, provide access to media files, such as song files, audio books, movie files, video clips, and other media data. In some implementations, separate audio and video services (not shown) can provide access to the respective types of media files. A syncing service 260 can, for example, perform syncing services (e.g., sync files). An activation service 270 can, for example, perform an activation process for activating the mobile device 202a or 202b. Other services can also be provided, including a software update service that automatically determines whether software updates exist for software on the mobile device 202a or 202b, then downloads the software updates to the mobile device 202a or 202b where the software updates can be manually or automatically unpacked and/or installed.

The mobile device 202a or 202b can also access other data and content over the one or more wired and/or wireless networks 210. For example, content publishers, such as news sites, RSS feeds, web sites, blogs, social networking sites, developer networks, etc., can be accessed by the mobile device 202a or 202b. Such access can be provided by invocation of a web browsing function or application (e.g., a browser) in response to a user touching, for example, a Web object.

Example Mobile Device Architecture

Figure 3:
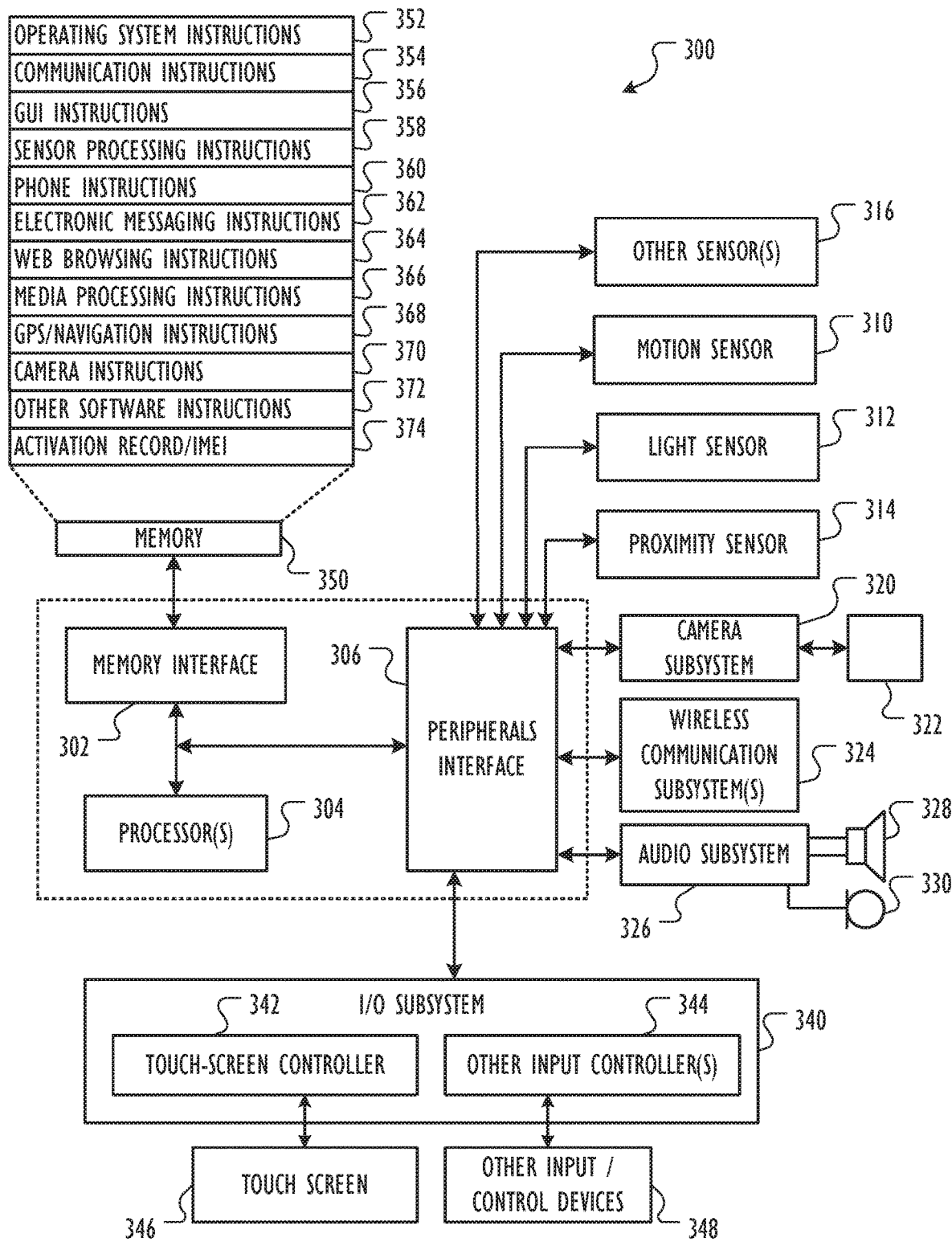
FIG. 3 is a block diagram of an example architecture for the mobile device of FIG. 1.

FIG. 3 is a block diagram of an example architecture for the mobile device of FIG. 1. The mobile device 100 can include a memory interface 302, one or more data processors, image processors and/or central processing units 304, and a peripherals interface 306. The memory interface 302, the one or more processors 304 and/or the peripherals interface 306 can be separate components or can be integrated in one or more integrated circuits. The various components in the mobile device 100 can be coupled by one or more communication buses or signal lines.

Sensors, devices, and subsystems can be coupled to the peripherals interface 306 to facilitate multiple functionalities. For example, a motion sensor 310, a light sensor 312, and a proximity sensor 314 can be coupled to the peripherals interface 306 to facilitate the orientation, lighting, and proximity functions described with respect to FIG. 1. Other sensors 316 can also be connected to the peripherals interface 306, such as a positioning system (e.g., GPS receiver), a temperature sensor, a biometric sensor, or other sensing device, to facilitate related functionalities.

A camera subsystem 320 and an optical sensor 322, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 324, which can include radio frequency receivers and transmitters and/or optical (e.g., infrared) receivers and transmitters. The specific design and implementation of the communication subsystem 324 can depend on the communication network(s) over which the mobile device 100 is intended to operate. For example, a mobile device 100 may include communication subsystems 324 designed to operate over a GSM network, a GPRS network, an EDGE network, a Wi-Fi or WiMax network, and a Bluetooth™ network. In particular, the wireless communication subsystems 324 may include hosting protocols such that the device 100 may be configured as a base station for other wireless devices.

An audio subsystem 326 can be coupled to a speaker 328 and a microphone 330 to facilitate voice-enabled functions, such as voice recognition, voice replication, digital recording, and telephony functions.

The I/O subsystem 340 can include a touch screen controller 342 and/or other input controller(s) 344. The touch-screen controller 342 can be coupled to a touch screen 346. The touch screen 346 and touch screen controller 342 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 346.

The other input controller(s) 344 can be coupled to other input/control devices 348, such as one or more buttons, rocker switches, thumb-wheel, infrared port, USB port, and/or a pointer device such as a stylus. The one or more buttons (not shown) can include an up/down button for volume control of the speaker 328 and/or the microphone 330.

In one implementation, a pressing of the button for a first duration may disengage a lock of the touch screen 346; and a pressing of the button for a second duration that is longer than the first duration may turn power to the mobile device 100 on or off. The user may be able to customize a functionality of one or more of the buttons. The touch screen 346 can, for example, also be used to implement virtual or soft buttons and/or a keyboard.

In some implementations, the mobile device 100 can present recorded audio and/or video files, such as MP3, MC, and MPEG files. In some implementations, the mobile device 100 can include the functionality of an MP3 player, such as an iPod™. The mobile device 100 may, therefore, include a 36-pin connector that is compatible with the iPod. Other input/output and control devices can also be used.

The memory interface 302 can be coupled to memory 350. The memory 350 can include high-speed random access memory and/or non-volatile memory, such as one or more magnetic disk storage devices, one or more optical storage devices, and/or flash memory (e.g., NAND, NOR). The memory 350 can store an operating system 352, such as Darwin, RTXC, LINUX, UNIX, OS X, WINDOWS, or an embedded operating system such as VxWorks. The operating system 352 may include instructions for handling basic system services and for performing hardware dependent tasks. In some implementations, the operating system 352 can be a kernel (e.g., UNIX kernel).

The memory 350 may also store communication instructions 354 to facilitate communicating with one or more additional devices, one or more computers and/or one or more servers. The memory 350 may include graphical user interface instructions 356 to facilitate graphic user interface processing; sensor processing instructions 358 to facilitate sensor-related processing and functions; phone instructions 360 to facilitate phone-related processes and functions; electronic messaging instructions 362 to facilitate electronic-messaging related processes and functions; web browsing instructions 364 to facilitate web browsing-related processes and functions; media processing instructions 366 to facilitate media processing-related processes and functions; GPS/Navigation instructions 368 to facilitate GPS and navigation-related processes and instructions; camera instructions 370 to facilitate camera-related processes and functions; and/or other software instructions 372 to facilitate other processes and functions, e.g., security processes and functions. The memory 350 may also store other software instructions (not shown), such as web video instructions to facilitate web video-related processes and functions; and/or web shopping instructions to facilitate web shopping-related processes and functions. In some implementations, the media processing instructions 366 are divided into audio processing instructions and video processing instructions to facilitate audio processing-related processes and functions and video processing-related processes and functions, respectively. An activation record and International Mobile Equipment Identity (IMEI) 374 or similar hardware identifier can also be stored in memory 350.

Each of the above identified instructions and applications can correspond to a set of instructions for performing one or more functions described above. These instructions need not be implemented as separate software programs, procedures, or modules. The memory 350 can include additional instructions or fewer instructions. Furthermore, various functions of the mobile device 100 may be implemented in hardware and/or in software, including in one or more signal processing and/or application specific integrated circuits.

Example Positioning System

Figure 4:
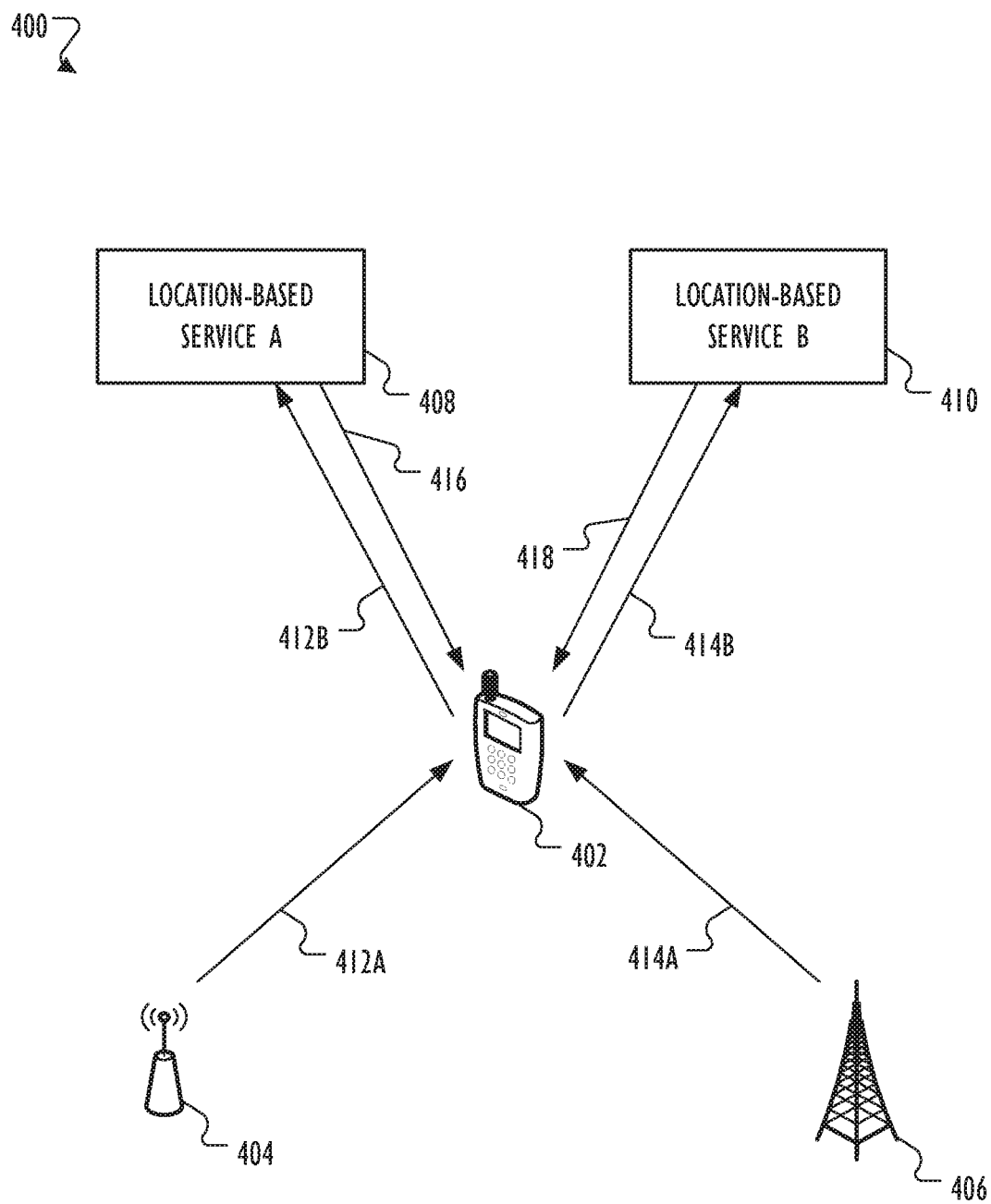
FIG. 4 illustrates an example positioning system which can be used with the mobile device of FIG. 1.

FIG. 4 illustrates an example positioning system which can be used with the mobile device of FIG. 1. In FIG. 4, mobile device 402 can represent mobile device 100. The mobile device 402 can, for example, communicate to one or more network access points 404 (e.g., Wi-Fi base station devices) or one or more cell towers 406. In some implementations, the access points 404 can be any combination of 802.11b/g wireless routers, 802.11n wireless routers, and some other Wi-Fi devices that implement any suitable Wi-Fi or other wireless networking technology or protocol (e.g., GPS protocol). Using the communication with the access points 404 or the cell towers 406, a location-based service 408 (Location-Based Service A) or a location-based service 410 (Location-Based Service B) can estimate geographic areas where the mobile device 402 is currently located. The actual location of the mobile device 402 can be anywhere within the estimated geographic area. An estimated geographic area is not necessarily circular but can be indicated as a circular area on a map display for convenience.

The mobile device 402 can, for example, receive a communication 412A from an access point 404 (e.g., a Wi-Fi access point). The communication 412A can include information about the access point 404, e.g., the Internet Protocol (IP) address and/or the Media Access Control (MAC) address of the access point 404. The communication 412A can include other information, such as the latitude and longitude of the access point 404. The information received in communication 412A can be sent to the location-based service 408 in communication 412B. The location-based service 408 can, for example, with a degree of uncertainty or error, estimate a first geographic area in which the mobile device 402 is currently located using the information sent in communication 412B. In some implementations, the location-based service 408 is a system or service that estimates, with some degree of uncertainty or error, the position of a device using a database of access points mapped to geographic locations. The accuracy or precision (or the degree of uncertainty or error) of the estimated position can, for example, be based on the range of the technology, the accuracy of the range, or some other metric. Accuracy or precision of an estimated position can be affected by one or more factors including, for example, inherent properties or limitations of the technology or system, and a level of deployment of the given technology or system (e.g., number of access points or cell towers in the vicinity of the device).

In some implementations, the accuracy or precision of the estimated position is stated in units of distance (e.g., "the estimated position is accurate up to 50 meters"). That is, the actual position of the mobile device 402 can be within the accuracy distance from the estimated position. For example, the first geographic area can be a circle centered at the latitude and longitude of the estimated position with a radius equal to the stated accuracy or precision (e.g. 38 meters if the accuracy of the estimated position is up to 38 meters). The first geographic area can alternatively be represented on a map display as a square, rectangle, oval, diamond, triangle, or some other shaped enclosed region.

In some other implementations, unique signatures of multiple access points (e.g. five or more) can be compared to a local cache on the mobile device 402 or a central reference database at location-based service 408 via network communication (e.g. communication 412B can be sent to the location-based service 408). The location-based service 408 can use the unique signatures to estimate the latitude and longitude of the center of the first geographic circle with an m meter radius (e.g., about 20 meters).

In some implementations, location-based service 408 includes positioning services and reference database information provided by SKYHOOK WIRELESS of Boston, Mass.

The mobile device 402 can receive a communication 414A from cell tower 406. The cell communication 414A can include, for example, information identifying the cell tower 406. In some implementations, the cell communication 414A can also include the latitude and longitude of the cell tower 406. The identifying information and/or the latitude and longitude of the cell tower 406 can be sent to the location-based service 410 in communication 414B. The location-based service 410 can estimate a position of the mobile device 402 using the information included in communication 414B and estimate an accuracy of the estimate position. Thus, for example, the location-based service 410 can estimate a second geographic area in which the mobile device 402 is currently located. In some implementations, the second geographic area is represented on a map as a circular region centered at the estimated position and with a radius equal to the accuracy of the estimated position. In some other implementations, the second geographic area can represented on a map by a square or rectangular shaped enclosed region, to name a few additional examples.

In some implementations, the position and the geographic area of the mobile device 402 can be estimated using a "cell of origin" positioning technology. In some other implementations, the second geographic area can be determined by cell tower triangulation.

The first and second geographic areas can be sent to the mobile device 402 by communications 416 and 418, respectively. The mobile device 402 can present, on the touch-sensitive display 102 for example, a map view including an indication of one of the geographic areas if that one is entirely contained within the other geographic area (including the case where the boundaries of the geographic areas touch but otherwise no part of the one of the geographic area is outside of the other geographic area). For example, a map view that includes an indication of the first geographic area can be presented if the first geographic area is completely contained within the second geographic area. The mobile device 402 can present a map view that includes an indication of the second geographic area if the first geographic area is not completely contained within the second geographic area. For example, if the technology, system, or service used to estimate the first geographic area has a greater level of accuracy or precision detail than the technology, system, or service used to estimate the second geographic area, and the first geographic area is determined to be more accurate or precise based on the first geographic area being entirely within the second geographic area, the mobile device 402 can use the first geographic area. The level of detail of the technology can, for example, be determined by a priority table stored in the mobile device 402.

In another example, the first geographic area can be estimated using the access point 404, and the second geographic area can be estimated using the cell tower 406. In this example, the access point 404 was moved from its original location and the latitude and longitude coordinates of the access point 404 as they are known to location-based service 408 are incorrect and the mobile device 402 is not actually located within the first geographic area. The cell tower 406 provided correct location-based data and the mobile device 402 is located within the second geographic area. In this situation, the first and second geographic areas do not overlap, so the mobile device 402 would display a map view indicating the second geographic area. The mobile device 402 can be used to determine the accuracy of the first and second geographic areas, or an external server or servers can be used.

The location-based service 408 and location-based service 410 can run on the same device or on separate devices. For example, the location-based services 408 and 410 can run on servers communicating with the mobile device 100 through a network (e.g., WAN 214). The servers can be separate servers or the same server. The location-based services 408 and 410 can alternatively run on the mobile device 402.

The mobile device 402 can, for example, connect to additional devices or services (not shown) for location-based services, instead of, or in addition to the access point 404 and the cell tower 406. Such devices or services could include a Bluetooth™ device, GPS, radio or TV towers, or cellular grids, to name a few examples. For example, the mobile device 402 can connect to peer devices with the Bluetooth™ communication device 188 (FIG. 1) and receive location-based information from other mobile devices and/or Bluetooth™ enabled devices. In some implementations, the mobile device 402 can determine or estimate its position and/or geographic area using other technologies (e.g., GPS). In some implementations, the geographic area determined or estimated using any of these other technologies can be used (e.g., displayed) in lieu of the geographic area estimated using location-based services 408 or 410 (.e.g., Wi-Fi or cellular positioning techniques) if the geographic area determined or estimated using the other technologies is contained entirely within the geographic area estimated using location-based services 408 or 410 and if the other technologies are more accurate or precise according to the priority table stored in the mobile device 402.

Location Sharing

Figure 5:
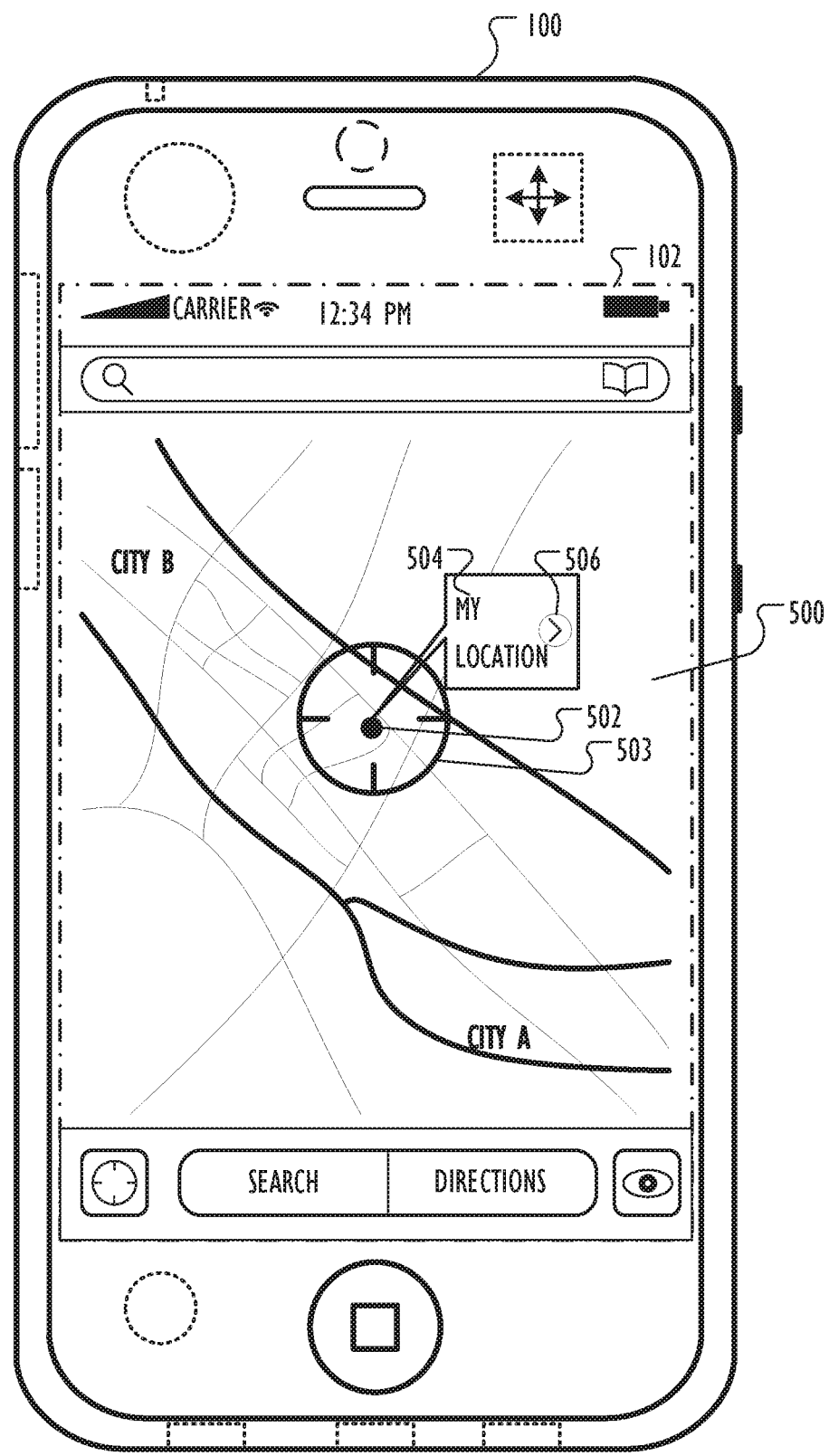
FIG. 5 illustrates an example map display showing the location of a mobile device.

FIG. 5 illustrates an example map display 500 showing the location of the mobile device 100. In the example, shown the location of the mobile device 100 is represented by a graphical placemark 502 (e.g., a dot or pushpin) within a geographic area defined by the circle 503. If accurate positioning technology is available (e.g., GPS) the circle 503 can be omitted from the map display 500. In some implementations, the user can touch the placemark 502 and a graphical object 504 (e.g., balloon, bubble, window, pane) appears showing the address or other information for the location represented by the placemark 502. If the user touches a chevron 506 a new page 600 is displayed, as shown in FIG. 6.

Figure 6:
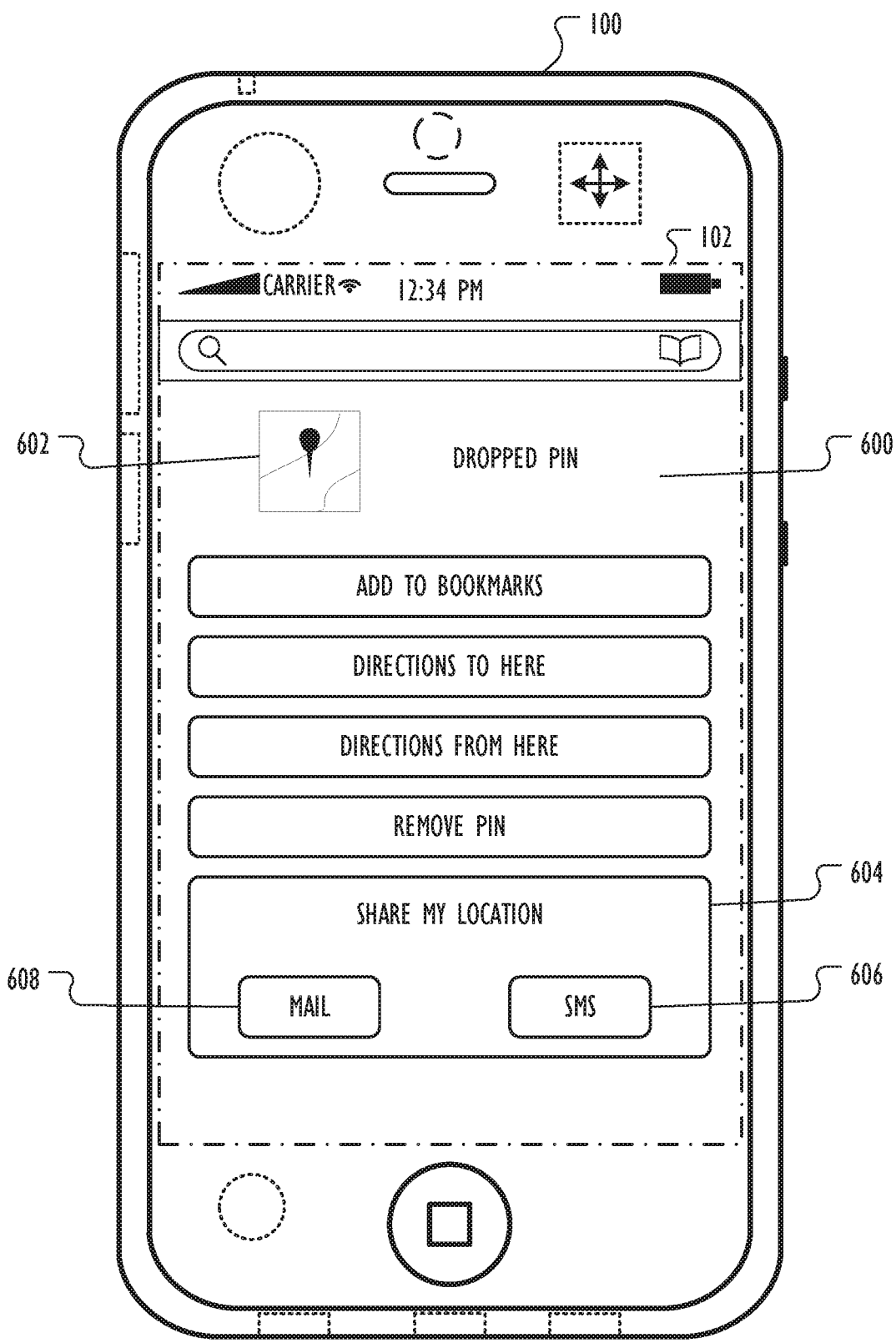
FIG. 6 illustrates an example user interface for sharing the location of the mobile device with other devices.

FIG. 6 illustrates an example user interface for sharing the location of the mobile device 100 with other devices. In the example shown, the page 600 includes a thumbnail image 602 of the geographic location of the mobile device 100. The thumbnail image 602 can be created from the map display 500 by "screen grabbing" a portion of the map display 500 around the placemark 502. The thumbnail image 602 can have a lower resolution than the map display 500. The page 600 can include various options, including without limitation: adding a location to a bookmark list, finding directions from a current location to a desired destination, removing pins and sharing a location with other users.

In some implementations, a location sharing option 604 is presented on the mobile device 100 which includes one or more applications that are available for sending geographic location data to other devices (e.g., other mobile devices or desktop computers). In this example, there is a button 608 for email and a button 606 for SMS messaging. Other applications can also be used such as Enhanced Messaging Service (EMS) and Multimedia Messaging Service (MMS). The geographic location data can be for the current location of the sending device or for any other geographic location (e.g., a location of a destination, landmark, business, mutual contact).

If the button 608 is touched, then an email user interface can be presented to the user with a geographic location data file automatically attached to the email message. The user can compose a text message for the email and send the email to another device. At the receiving device, the attached file can be detected and used to trigger a map display showing the sender's location and, optionally, the geographic location of the receiving device.

If the button 606 is touched, then an SMS user interface can be presented to the user. As described further in reference to FIG. 7A, the geographic location data can be provided with the SMS message. The SMS message can be coded or formatted at the sending device to enable the receiving device to detect the presence of the geographic location data with the message. Upon such detection, one or actions can be performed.

Initiating Location Sharing Using Messages

Figure 7A:
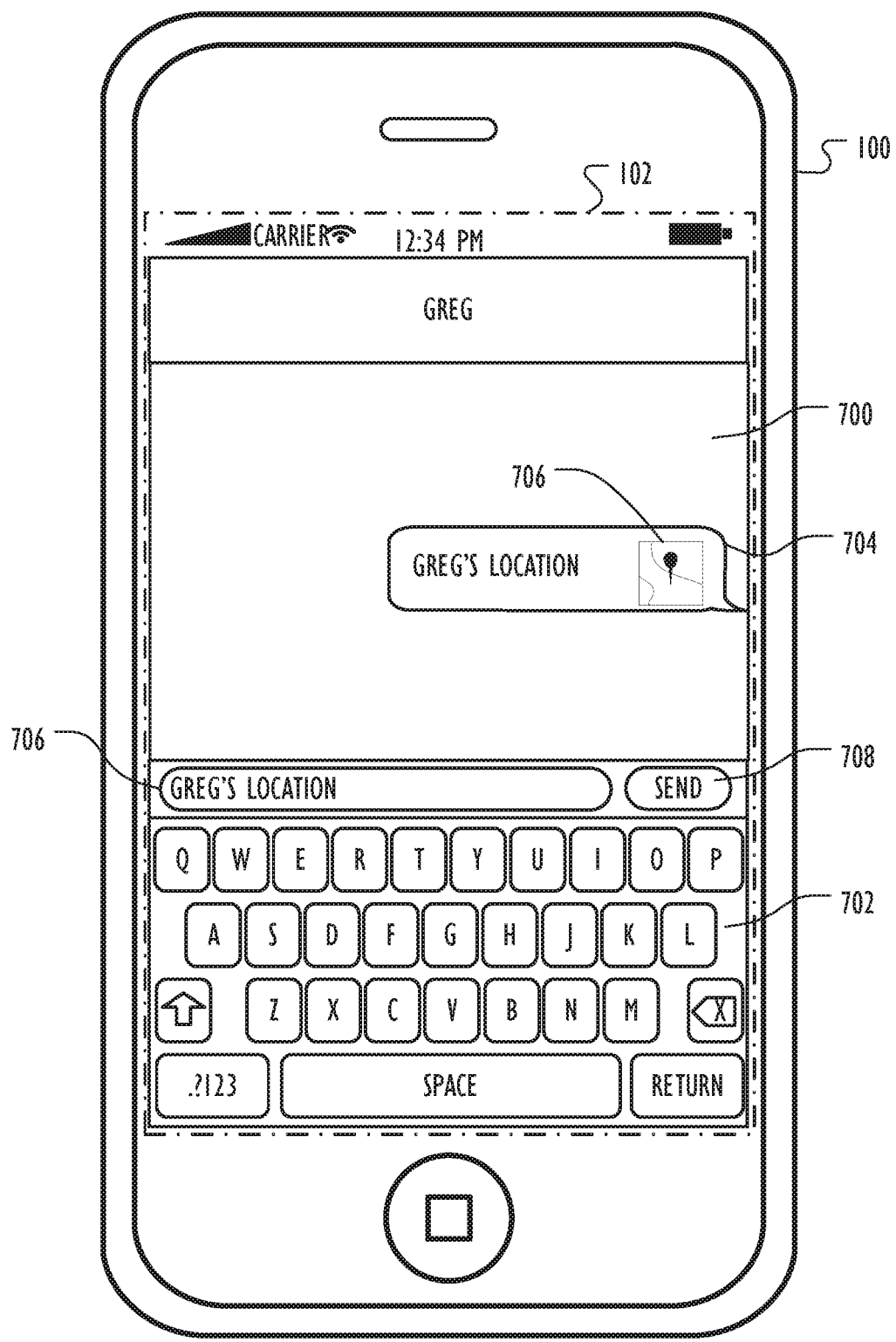
FIG. 7A illustrates an example user interface for instant messaging or SMS/text messaging used by a sending device.

FIG. 7A illustrates an example user interface for instant messaging or SMS/text messaging used by a sending device. The user interface includes a chat area 700, a message composing box 706, and a virtual keyboard 702. In this example, when the user touches the button 606 (FIG. 6), the user interface shown in FIG. 7A is presented. A graphical object 704 is shown in the chat area 700 with an icon 706 to indicate that the message will be sent with geographic location data to the receiving device. The icon 706 can be a thumbnail image similar to the thumbnail image 602 shown in FIG. 6. The user can compose a message using the composing box 706 and can initiate sending the message by touching the send button 708. In the example shown, the user ("Greg") is sending his current location to a friend named "Mike" who he is currently engaged in a chat session with Greg. Greg types "Greg's location" in the composing box 706 and touches the send button 708 to send the message with the geographic location data associated with the current location of Greg's mobile device 710.

Figure 7B:
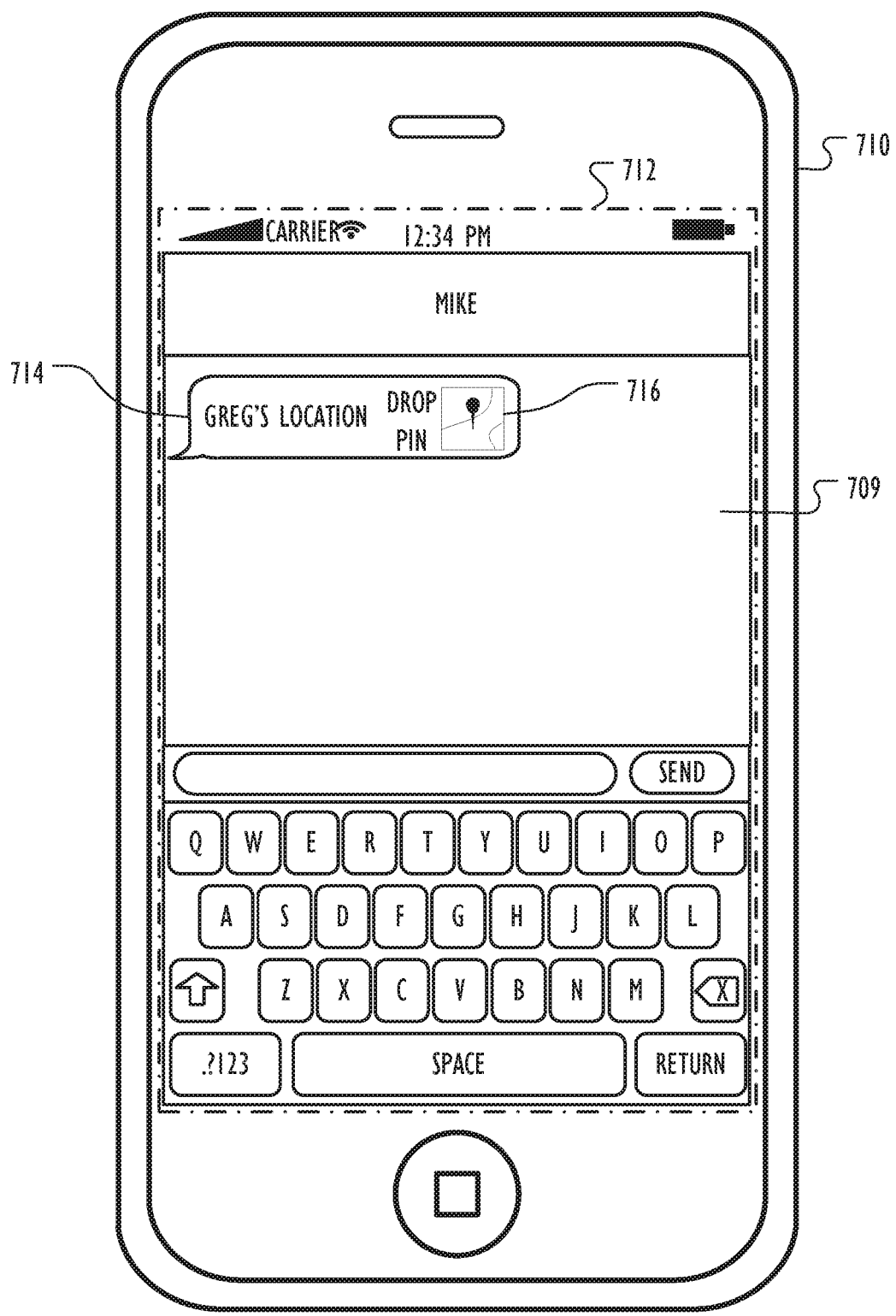
FIG. 7B illustrates an example user interface for instant messaging or SMS/text messaging used by a receiving device.

FIG. 7B illustrates an example user interface for instant messaging or SMS/text messaging used by a receiving device. Continuing with the example of FIG. 7A, the message sent by Greg is received at Mike's mobile device 710. The message is received in a balloon 714 in a chat area 709. When Mike touches the icon 716, a map display 802 is presented on the mobile device 710 as shown in FIG. 8.

Figure 8:
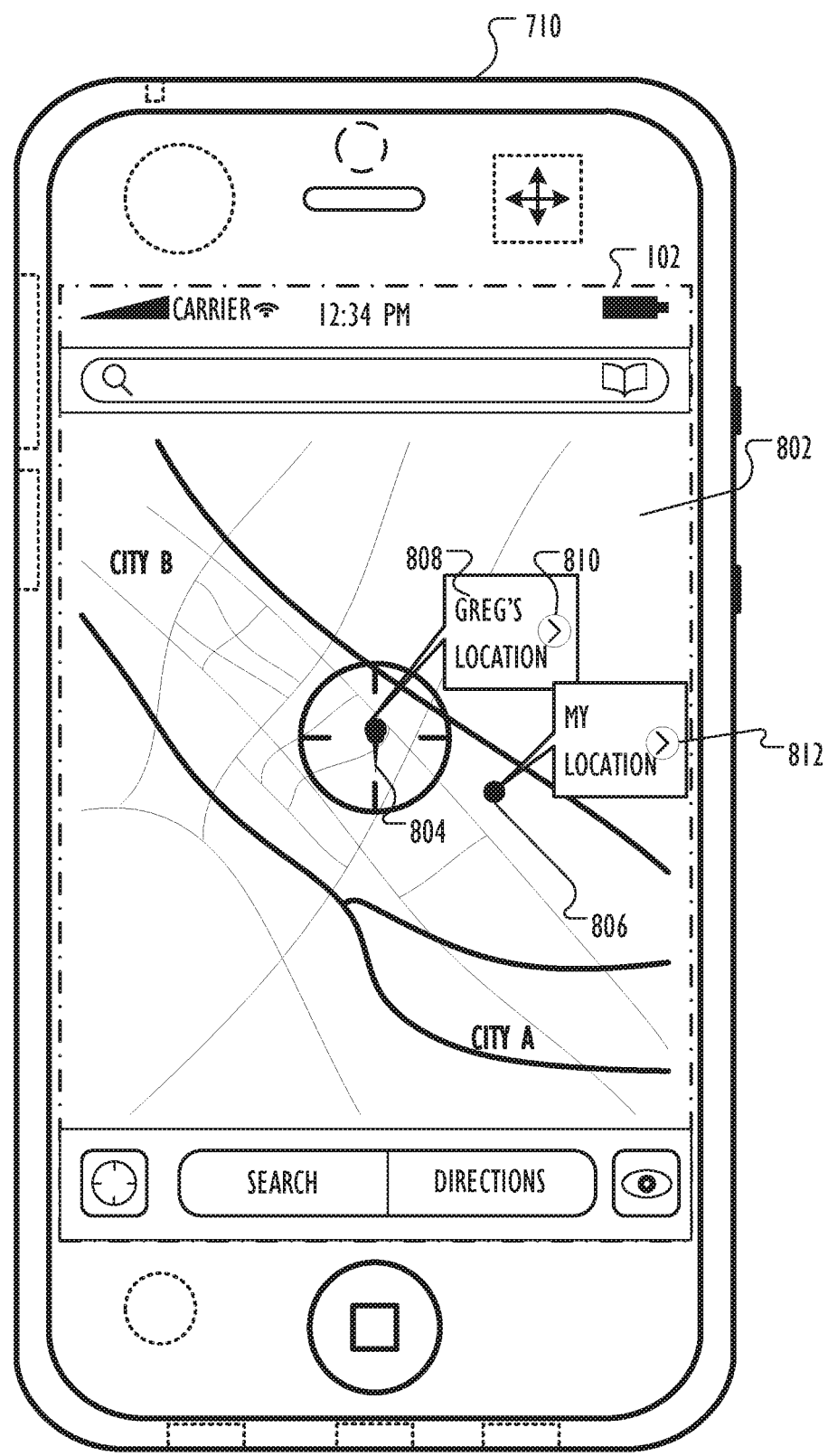
FIG. 8 illustrates an example map display showing locations for a sending and receiving device.

FIG. 8 illustrates an example map display 802 showing locations for the sending device 100 and the receiving device 710. The geographic location of the mobile device 100 (Greg's mobile device) can be represented on the map display 802 by a placemark 804. When Mike touches the placemark 804 a graphical object 808 is displayed on the map display 802 with geographic location data (e.g., address) or other related information (e.g., phone number, email, vcard, link). Optionally, the location of the mobile device 710 is represented on the map display 802 by a placemark 806. Touching the chevrons 810 or 812 results in pages being displayed that are similar to page 600 shown in FIG. 6, but specific to the locations represented by the placemarks 804 and 806, respectively.

Example Location Sharing Process (Sending Device)

Figure 9:
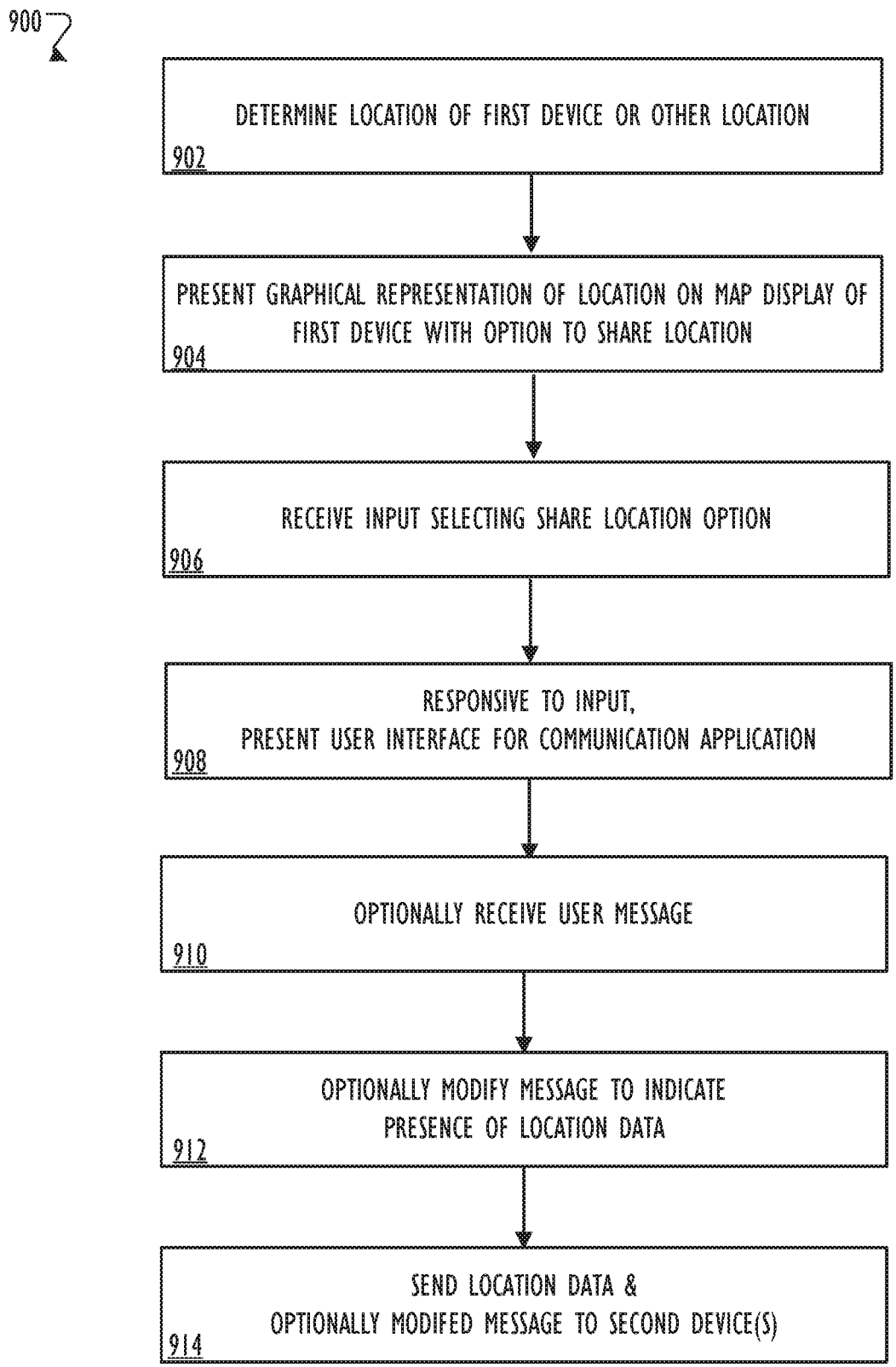
FIG. 9 is a flow diagram of an example process for sharing location data which can be implemented by a sending device.

FIG. 9 is a flow diagram of an example process 900 for sharing geographic location data which can be implemented by a sending device (e.g., mobile device 100). In some implementations, the process 900 begins by determining a location of a first device (902). The location can be determined using one or more positioning technologies (e.g., GPS, cell tower, triangulations, Wi-Fi). A graphical representation of the location is presented on a map display of the first device with an option to share the location (904). For example, a placemark (e.g., a dot, circle, pushpin) can be presented on the map display. In FIG. 5, the user can touch a chevron 506 to display a user interface that provides an option to share location information.

Input is received specifying an option to share location information associated with the first mobile device (906). An example user interface is the page 600 shown in FIG. 6. The user can select from one or more applications to share location data (908). Some examples of applications are email and instant messaging. For email or instant messaging applications, a message composed by the user can be received (910).

With some applications, such as SMS messaging applications, the amount of data that can be sent with a text message is limited. The location information (e.g., address or position coordinates) can be included in a URL that is sent to the receiving device. To reduce the size of the URL, a short identifier or alias can be created for the URL (e.g., using hashing techniques) and sent to the second device in place of the longer URL. When the recipient user touches or clicks on the alias, the receiving device redirects the short identifier or alias to the longer URL containing the geographic location data. In some implementations, the geographic location data can be sent as a file to the receiving device where it can be opened and read. In some implementations, the indicator or alias redirects the receiving device to a network-based resource (e.g., a map service server) for receiving the geographic location data and any other related information.

In some implementations, the text message string can be optionally modified (e.g., coded or formatted) to signal the presence of geographic location data associated with the message (912). The modifying can be detected by the receiving device and used by the receiving device to initiate one or more actions on the receiving device, as described in reference to FIG. 10. Some example formatting techniques can include adding one or more spaces or symbols to a text string, changing the style, size or font of the text string (e.g., bold, italic). For example, a message sent from "1 Infinite Loop, Cupertino, Calif." may be formatted as follows: "_ _ 1 Infinite Loop, Cupertino, Calif." In this example, two spaces "_ _" were added to the beginning of the text string. These spaces can be detected by the receiving device and used to inform the receiving device that the text message is an address. The receiving device can invoke a map service client to display the location "1 Infinite Loop, Cupertino, Calif." on a map display of the receiving device. While any suitable coding or formatting technique can be used, it may be desirable to select a code or format that is human readable and has a low probability of being part of text composed by the user or otherwise makes the text difficult to read. In some implementations where the device is a mobile phone, a GSM7 alphabet or similarly known alphabet can be used to indicate the presence of geographic location data with a message.

The location data (e.g., the URL) and optionally modified text message is sent to the receiving device using the selected location sharing application (914). In some implementations, the sending device can broadcast geographic location data to multiple devices. The user can set a schedule for the broadcast. For example, the user can set the device to broadcast geographic location data at a desired frequency and duration (e.g., every hour for a week).

In some implementations, a user can activate a mode on the mobile device for continuous location sharing. For example, a first user can continually track the location of a second user who has agreed to share their location with the first user. This can be a useful feature for two users who are trying to find each other at a crowded public venue or in a city, etc.

In some implementations, a first user can ask a second user for their location in several ways. As described above, a mode can be activated where a user's/mobile device location is continually shared to allow tracking. A location can be requested using text messaging. Mobile devices of recipient users can detect the messages and automatically present a user interface for requesting location sharing. A dedicated location sharing user interface can be presented on the mobile device. The dedicated user interface could be displayed in a maps application, for example.

Example Location Sharing Process (Receiving Device)

Figure 10:
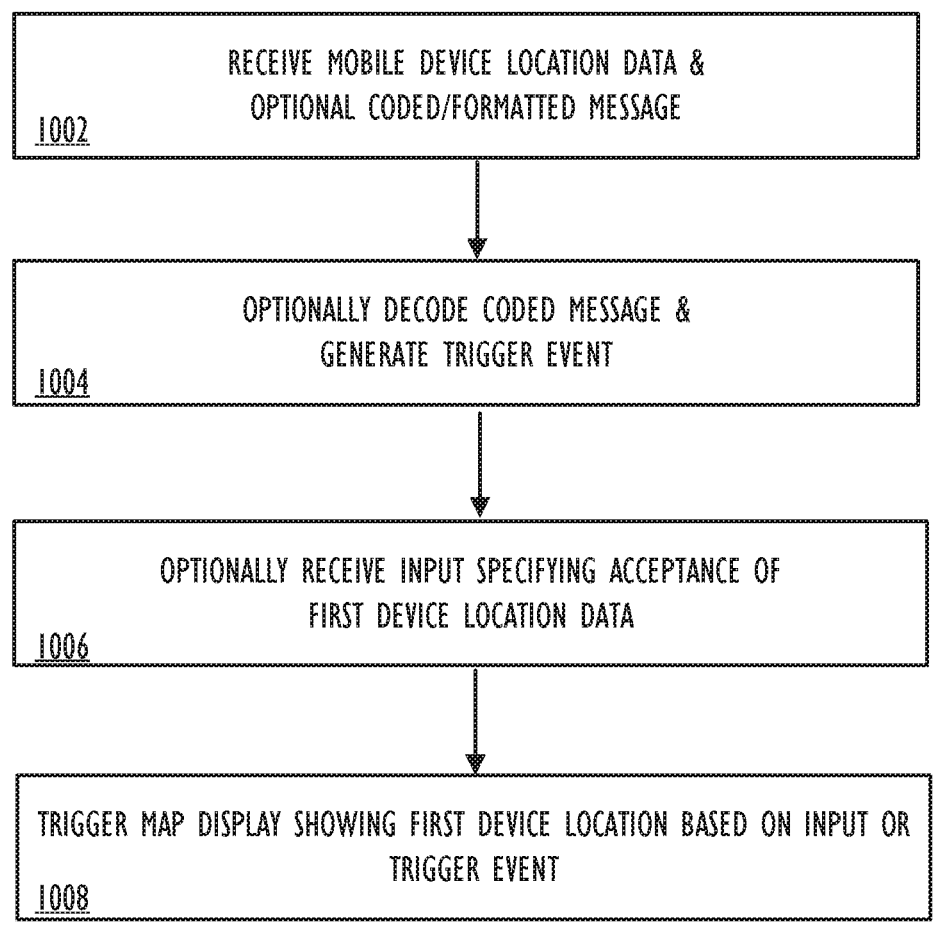
FIG. 10 is a flow diagram of an example process for sharing location data which can be implemented by a receiving device.

FIG. 10 is a flow diagram of an example process 1000 for sharing location data which can be implemented by a receiving device (e.g., the receiving device 710). In some implementations, the process 1000 begins by receiving geographic location data from the first device and an optionally coded/formatted text message (1002). The text message is decoded or detected and used to generate a trigger event (1004). For example, the text string can be parsed and searched for a pattern, such as added spaces at the beginning of a text string, as described in the previous example. Input is optionally received by the recipient specifying acceptance of the geographic location data (1006). For example, a user interface can be presented asking the user whether they wish to accept the data. The trigger event or user input can initiate one or more actions, such as automatically generating a map display showing the location of the first device and, optionally, the location of the second device (1008). A route from the first device to the second device can be generated by a map service and displayed on the map display of the first and/or second device.

Sharing Contact Information

In some implementations, in addition to location information, contacts can be shared as an email (e.g., as a vcard) or as an SMS message. For contact sharing between mobile devices, an SMS message may be restricted to text of a GSM character set. One issue with receiving a contact as a text message is how to format the information in the contact. In some implementations, the SMS message can use space encoding (or encoding using non-visible characters) to delineate data fields in the contact information. Upon receipt, the encoded SMS message is decoded, and the contact information is added to appropriate fields of a new contact in an address book application, for example. Additionally, formatting information can be stripped from a v-card or contact prior to sending the v-card or contact information over SMS.

The features described can be implemented in digital electronic circuitry, or in computer hardware, firmware, software, or in combinations of them. The features can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

A number of implementations have been described. Nevertheless, it will be understood that various modifications may be made. For example, elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:
presenting a graphical placemark on a map display, the graphical placemark corresponding to a geographic location of a first device;
receiving a selection of a graphical object;
in response to the selection of the graphical object, presenting a first user interface for specifying two or more mechanisms for sharing the geographic location;
obtaining input to the first user interface specifying a messaging mechanism for sharing geographic location data with a second device;
presenting a second user interface for specifying a duration for sharing the geographic location data;
presenting a messaging interface, the messaging interface displaying a message including a URL, wherein the geographic location data is encoded in the URL;
sending the message to the second device;
sending one or more updated geographic locations of the first device, the one or more updated geographic locations accessible to the second device; and
stopping the sending of the one or more updated geographic locations after the specified duration.

2. The method of claim 1, wherein sending the one or more updated geographic locations comprise continuously sending the one or more updated geographic locations during the specified duration.

3. The method of claim 1, wherein the URL comprises a reduced size URL based on a hash of a longer URL, the longer URL containing the geographic location data.

4. The method of claim 1, wherein the messaging mechanism comprises a text messaging mechanism.

5. The method of claim 1, wherein the messaging mechanism comprises a chat messaging mechanism.

6. A non-transitory computer-readable medium having instructions stored thereon, which, when executed by a processor, cause the processor to perform operations comprising:
presenting a graphical placemark on a map display, the graphical placemark corresponding to a geographic location of a first device;
receiving a selection of a graphical object;
in response to the selection of the graphical object, presenting a first user interface for specifying two or more mechanisms for sharing the geographic location;
obtaining input to the first user interface specifying a messaging mechanism for sharing geographic location data with a second device;
presenting a second user interface for specifying a duration for sharing the geographic location data;
presenting a messaging interface, the messaging interface displaying a message including a URL, wherein the geographic location data is encoded in the URL;
sending the message to the second device;
sending one or more updated geographic locations of the first device, the one or more updated geographic locations accessible to the second device; and
stopping the sending of the one or more updated geographic locations after the specified duration.

7. The non-transitory computer-readable medium of claim 6, wherein sending the one or more updated geographic locations comprise continuously sending the one or more updated geographic locations during the specified duration.

8. The non-transitory computer-readable medium of claim 6, wherein the URL comprises a reduced size URL based on a hash of a longer URL, the longer URL containing the geographic location data.

9. The non-transitory computer-readable medium of claim 6, wherein the messaging mechanism comprises a text messaging mechanism.

10. The non-transitory computer-readable medium of claim 6, wherein the messaging mechanism comprises a chat messaging mechanism.

* * * * *